United States Patent
Moshkov et al.

(10) Patent No.: US 11,790,301 B2
(45) Date of Patent: Oct. 17, 2023

(54) REDUCING LATENCY USING PRE-AGGREGATION DATA PROCESSING TECHNIQUES

(71) Applicant: JetSmarter Inc., Fort Lauderdale, FL (US)

(72) Inventors: Alexey Moshkov, Fort Lauderdale, FL (US); Olga Oleyarsh, Fort Lauderdale, FL (US)

(73) Assignee: JetSmarter Inc., Fort Lauderdale, FL (US)

( * ) Notice: Subject to any disclaimer, the term of this patent is extended or adjusted under 35 U.S.C. 154(b) by 1047 days.

(21) Appl. No.: 15/942,037

(22) Filed: Mar. 30, 2018

(65) Prior Publication Data

US 2019/0303833 A1   Oct. 3, 2019

(51) Int. Cl.
G06Q 10/0639 (2023.01)
G06F 16/248 (2019.01)
G06F 16/29 (2019.01)

(52) U.S. Cl.
CPC ..... G06Q 10/06393 (2013.01); G06F 16/248 (2019.01); G06F 16/29 (2019.01)

(58) Field of Classification Search
CPC .............. G06Q 10/06393; G06Q 30/0205
See application file for complete search history.

(56) References Cited

U.S. PATENT DOCUMENTS 9,904,964 B1 * 2/2018 O'Neil-Dunne ... G06Q 30/0635
11,054,270 B1 * 7/2021 Singh ................... G01C 21/343
2009/0216746 A1 * 8/2009 Aubin .................... G06Q 50/14
2011/0166898 A1 * 7/2011 Zarrow .................. G06Q 10/02
    705/5
2013/0073586 A1 * 3/2013 Aubry ................. G06F 16/2455
    707/769
2013/0080239 A1 * 3/2013 Okerlund ........... G06Q 30/0226
    705/14.33

(Continued)

OTHER PUBLICATIONS

Banavar Sridhar et al, Modeling and Optimization in Traffic Flow Management, Proceedings of the IEEE (vol. 96, Issue: 12, Dec. 2008), pp. 2060-2080 (Year: 2008).*

(Continued)

*Primary Examiner* — Andre D Boyce
(74) *Attorney, Agent, or Firm* — Fish & Richardson P.C.

(57) ABSTRACT

Methods, systems, and apparatus, including computer programs encoded on a computer storage medium, that reduce latency using pre-aggregation data processing techniques are described. In one aspect, a system includes a first data processing apparatus that extracts, from multiple data sources, data related to segments and generates, for each segment, data set(s) that include data specific to the segment, each data set for a segment including data for one or more particular data dimensions. A second data processing apparatus accesses the data sets and processes a set of rules to aggregate the data. The aggregating can include, for each of multiple data dimensions that include a set of corresponding data items, identifying time periods for which to aggregate data for the data dimension and, for each time period, identifying, for aggregation, data sets that correspond to the data dimension and to a segment that departed during the time period.

20 Claims, 12 Drawing Sheets

(56) References Cited

U.S. PATENT DOCUMENTS

| | | | |
|---|---|---|---|
| 2013/0104251 A1* | 4/2013 | Moore | G06F 21/602 |
| | | | 726/30 |
| 2014/0258032 A1* | 9/2014 | Psota | G06Q 30/0609 |
| | | | 705/26.35 |
| 2014/0278086 A1* | 9/2014 | San Filippo | G01C 21/3492 |
| | | | 701/527 |
| 2014/0351037 A1* | 11/2014 | Shaam | G06Q 30/0222 |
| | | | 705/14.23 |
| 2015/0073929 A1* | 3/2015 | Psota | G06Q 30/0605 |
| | | | 705/26.2 |
| 2015/0074259 A1* | 3/2015 | Ansari | H04L 67/02 |
| | | | 709/224 |
| 2015/0081349 A1* | 3/2015 | Johndrow | G06Q 20/3224 |
| | | | 705/5 |
| 2015/0294238 A1* | 10/2015 | Benque | G06Q 10/025 |
| | | | 705/6 |
| 2016/0003637 A1* | 1/2016 | Andersen | G06Q 10/10 |
| | | | 701/519 |
| 2016/0093221 A1* | 3/2016 | Bailey | G08G 5/0039 |
| | | | 701/120 |
| 2016/0093222 A1* | 3/2016 | Hale | G08G 5/0021 |
| | | | 701/120 |
| 2016/0378874 A1* | 12/2016 | Jafri | H04L 67/02 |
| | | | 707/706 |
| 2017/0108339 A1* | 4/2017 | Silverstein | G01S 5/0054 |
| 2017/0344703 A1* | 11/2017 | Ansari | H04M 15/73 |
| 2018/0146041 A1* | 5/2018 | Moustafa | H04L 41/5025 |
| 2018/0182017 A1* | 6/2018 | O'Neil-Dunne | G06F 16/2455 |
| 2019/0102407 A1* | 4/2019 | Young | G06F 3/04883 |
| 2019/0268645 A1* | 8/2019 | Fuetsch | H04N 21/44204 |
| 2019/0306574 A1* | 10/2019 | Eccles | G06F 16/687 |
| 2020/0151611 A1* | 5/2020 | McGavran | H04W 4/44 |
| 2021/0114616 A1* | 4/2021 | Altman | H04W 40/02 |

OTHER PUBLICATIONS

Bob Briscoe et al, Reducing Internet Latency: A Survey of Techniques and Their Merits, IEEE Communication Surveys & Tutorials, vol. 18, No. 3, Third Quarter 2016, pp. 2149-2196 (Year: 2016).*

* cited by examiner

ROUTES SUMMARY

| Route Group | Total Spots | Totals Spots Claimed | Load Factor | Boarded Clients | Creator Claimed Spots | Empty Spots | Total Segments | Scheduled Segments | Client-initiated Segments | Scheduled Segment Amount | Client-Initiated Segment Amount | Total Amount |
|---|---|---|---|---|---|---|---|---|---|---|---|---|
| ▲ East Coast | 2781 | 2134 | 77% | 2087 | 184 | 647 | 309 | 45 | 264 | 906 | 13,253 | 14,159 |
| ▲ West Coast | 7810 | 6811 | 87% | 6799 | 309 | 999 | 875 | 67 | 808 | 2,345 | 47,268 | 49,613 |
| ▲ Central | 1260 | 896 | 71% | 889 | 18 | 364 | 155 | 31 | 124 | 465 | 4,953 | 5,418 |
| ▲ Europe | 3813 | 2955 | 77% | 2789 | 77 | 858 | 260 | 46 | 214 | 2,298 | 19,383 | 21,681 |
| ▲ Holiday | 1391 | 902 | 65% | 898 | 45 | 489 | 155 | 33 | 122 | 1320 | 7,569 | 8,889 |
| Total: | 17,055 | 13,698 | 80% | 13,462 | 633 | 3,357 | 1,754 | 222 | 1,532 | 7,334 | 92,426 | 99,760 |

Date range: 03/01/2018 – 03/31/2018

FIG. 3

Springfield - Greenville

| OVERVIEW | MEMBERS | DEMAND | FLIGHTS | FINANCIALS | SUPPLY |

DAILY DOW WEEKLY MONTHLY ALL

03/01/2018 – 03/31/2018

| Day | Direction | Load Factor | Empty Spots | Total Spots | Total Claimed Spots | Boarded Clients | Token Spots | Waitlist | Scheduled Segments | Client-initiated Segments | Estimated Operator Amount | Received Amount |
|---|---|---|---|---|---|---|---|---|---|---|---|---|
| Sunday | SP-GR | 69% | 16 | 52 | 36 | 35 | 31 | 2 | 4 | 2 | 211 | 245 |
| Sunday | GR-SP | 53% | 27 | 58 | 31 | 31 | 19 | 6 | 4 | 3 | 134 | 145 |
| Monday | SP-GR | 91% | 11 | 110 | 99 | 97 | 45 | 87 | 4 | 8 | 241 | 233 |
| Monday | GR-SP | 99% | 1 | 108 | 107 | 107 | 101 | 328 | 4 | 10 | 345 | 299 |
| *** | *** | *** | *** | *** | *** | *** | *** | *** | *** | *** | *** | *** |
| Total | | 60% | 442 | 1148 | 689 | 679 | 510 | 1567 | 56 | 63 | 2,879 | 2,918 |

FIG. 5

REDUCING LATENCY USING PRE-AGGREGATION DATA PROCESSING TECHNIQUES

BACKGROUND

This specification relates to data processing.

With the advent of computers and computer networks, vast amounts of data can be collected and processed. However, much of the data may be in incompatible formats, incomplete, and/or inaccurate. Processing such data can be difficult and/or require substantial computing resources to ensure that the data is accurate and in a proper format prior to being relied upon.

SUMMARY

In general, one innovative aspect of the subject matter described in this specification can be embodied in systems that include a first data processing apparatus that extracts, from multiple data sources, data related to segments provided by a segment service provider and generates, for each segment, one or more data sets that include data specific to the segment. Each data set for a segment can include data for one or more particular data dimensions. A second data processing apparatus can access the data sets and process a set of rules to aggregate the data. The aggregating can include, for each of multiple data dimensions that include a set of corresponding data items, identifying a set of time periods for which to aggregate data for the data dimension and, for each time period, identifying data sets that correspond to the data dimension and to a segment that departed during the time period, for each data item of the data dimension, aggregating, from each of the identified data sets, data corresponding to the data item, and storing the aggregated data in an aggregated data storage unit. An application programming interface (API) data processing apparatus can receive, from an application executing on a device, data specifying an interface that will be presented at the application and one or more data dimensions for which the interface will present data, extract, from the aggregated data storage unit, responsive data based on the interface that will be presented at the application and the one or more data dimensions for which the interface will present data, and provide, to the application, at least the responsive data for presentation by the application. Other embodiments of this aspect include corresponding methods, apparatus, and computer programs, configured to perform the actions of the methods, encoded on computer storage devices.

These and other embodiments can each optionally include one or more of the following features. In some aspects, the API data processing apparatus determines one or more performance measures for one or more routes using the responsive data and provides, to the application, the determined one or more performance measures for presentation by the application.

In some aspects, each data dimension corresponds to a type of entity and the corresponding data items for each data dimension include data related to the type of entity. A particular data dimension can be a route between a first geographic location and a second geographic location for which segments are provided by the segment service provider.

Some aspects include a staging module that extracts data from the data sets and generates, for each data set, a table with at least a portion of the data in the data set. Each table can include data specifying a first geographic identifier for an origin, a second geographic identifier for a destination, a departure date for the segment corresponding to the data set for which the table was generated, and the at least a portion of the data in the data set. A particular data dimension can be routes between two geographic locations. The second data processing apparatus can identify data for aggregation for a particular route by comparing geographic identifiers for the particular route to the first and second geographic identifiers for each table and comparing a time period for the particular data dimension to departure date for each table.

Particular embodiments of the subject matter described in this specification can be implemented so as to realize one or more of the following advantages. The performance of routes serviced by segments on which member clients travel can be more accurately determined by selecting an appropriate data processing model for attributing membership data of each individual member to the various routes. The selection between multiple models allows membership data (e.g., a membership amount provided by the client) to be attributed to the appropriate routes on which the member travels or is likely to travel. When data for a client is not available, the membership data for the client can be attributed across all routes. Later, when data for the client becomes available, the membership data can be redistributed using a different data processing model that attributes the membership data based on the available data.

Data can be aggregated before being requested for the computation of performance measures and/or for presentation to reduce latency in presenting the data. The data can be aggregated periodically, e.g., based on a specified time period, so that the aggregated data reflects new data while also providing reduced latency. In addition, the data can be aggregated for various time periods for which the data will be presented so that the data for each time period can be presented with reduced latency.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a screen shot of an example interface that presents aggregated analytical data for route groups.

FIG. 5 is a screen shot of an example interface that presents day-of-the-week analytical data for a route.

Like reference numbers and designations in the various drawings indicate like elements.

DETAILED DESCRIPTION

Figure 1:
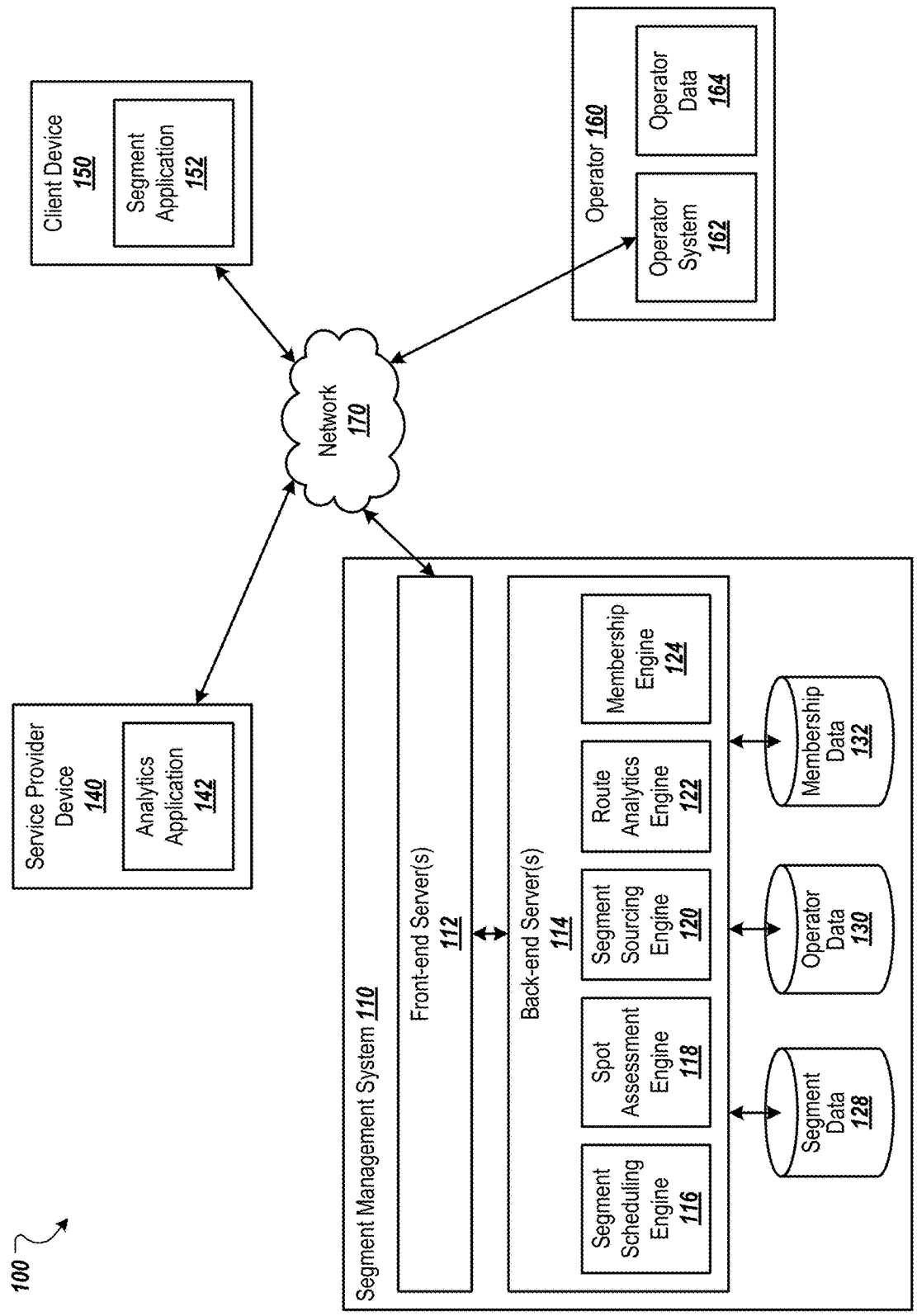
FIG. 1 is a block diagram of an example environment in which a segment management system manages segments and processes data related to the segments.

This document describes methods, systems, devices and computer readable medium that facilitate the extraction, aggregation, and analytics of data related to segments provided for clients. As used throughout this document, a segment refers to a flight between an origin and a destination. The term segment refers to any type of flight that carries clients, including shuttles (e.g., a flight between a set of locations specified by the service provider) and charters (e.g., a flight between two locations freely specified by a client). As described in detail below, the segment can be initiated by a client (e.g., a member of a service and/or a user of an application that facilitates creation of the segment), and made available to other clients, for example, by way of a native mobile application (or another appropriate interactive environment, such as a web interface). The aircraft used to travel between the origin and destination is typically a non-commercial aircraft (e.g., a private jet). While any appropriate type of aircraft (e.g., a propeller aircraft, a jet aircraft, or a rotorcraft) can be used, they will be collectively referred to using the term "jet" for brevity.

A route refers to two particular locations between which segments are provided by a segment service provider. The locations can be cities, airports, or regions (e.g., Central U.S. or Europe). For example, a first route may be for segments between Springfield and Greenville (e.g., segments from Greenville to Springfield and segments from Springfield to Greenville) and a second route may be between New York and Europe. Multiple segments may provide service for a route. For example, segments may be scheduled to fly between the locations periodically, e.g., every Monday and Friday, and additional segments for the route may be initiated by clients. In another example, segments for a route may be scheduled to depart from multiple airports in a city or region of the route to the other city or region of the route.

Clients that want to travel from an origin to a destination can claim a spot on a scheduled segment or initiate a custom client-initiated segment on the date the client wants to travel. A spot refers to seat or other appropriate area of occupancy for a client on a jet that is used for the segment.

A segment service provider may provide private jet travel using a membership model in which clients provide a membership amount before being able to claim spots on segments provided by the service provider. Clients may also have to provide additional amounts for some segments, e.g., to initiate a segment, claim a spot on longer segments, or to claim multiple spots on any given segment. In a private jet membership environment, the metrics used to determine the performance of a segment or route is different from other airline models. For example, the performance of a private jet route in a membership model is based on membership amounts received from the clients and how those membership amounts are attributed to the various routes, which can be difficult to attribute accurately due to lack of information for some clients and the changing travel patterns of individual clients. Thus, the metrics, including membership attribution, route performance, estimated operator costs, and metrics for client-initiated segments, used in a private jet membership environment are unconventional approaches to assessing the performance of flights. These new metrics require the creation of new data (e.g., membership amounts attributed to routes, estimated flight costs based on estimated flight time, data related to client-initiated segments, etc.) that did not previously exist. For example, the performance of a route serviced by the segments can be determined based on the membership amounts provided by at least some of the clients and the additional amounts provided for segments on the route. However, as some clients may not travel on the route and some clients may not have claimed a spot on any segments (e.g., new clients), accurately (or fairly) attributing the membership amounts to the appropriate routes can be difficult.

Multiple membership data attribution models (also referred to herein as data processing models) can be used to attribute membership amounts received from clients to appropriate routes. The appropriate membership data attribution model can be selected on a per-client basis based on the type of membership data available for the client. For example, if the membership data for a client indicates that the client has claimed a spot on one or more segments, a membership data attribution model that attributes the membership amount of the client to each of the one or more segments based on the number of spots the client has claimed on each segment can be selected.

If the membership data for a client indicates that the client has not yet claimed a spot on any segment, the appropriate membership data attribution model can be selected based on whether the membership data for the client includes a geographic identifier for a primary geographic location for the client (e.g., a location of residence for the client). If so, a membership data attribution model that attributes the membership amount based on other clients that have a same geographic identifier can be selected as clients from the same area may be likely to travel on the same segments. If the membership data for a client indicate that the client has not yet claimed a spot on any segment and does not include a geographic identifier, a membership data attribution model that attributes the membership amount to each route for which the segment service provider provides segments can be selected. For example, this membership data attribution model can attribute the membership amount to each route based on the number of segments provided on the route relative to the total number of segments provided by the segment service provider across all routes for which the segment service provider provides segments. If the membership data for the client is updated, the membership amount for the client can be re-attributed based on one of the other data attribution models.

FIG. 1 is a block diagram of an example environment 100 in which a segment management system 110 manages segments and processes data related to the segments. The example environment 100 includes a data communication network 170, such as a local area network (LAN), a wide area network (WAN), the Internet, a mobile network, or a combination thereof. The network 170 connects client devices 150 of clients, operator systems 162 of operators 160, and service provider devices 140 of a segment service provider to the segment management system 110 of the segment service provider. The example environment 100 may include many different client devices 150, service provider devices 140, and operators 160.

The segment management system 110, which can be operated and maintained by the segment service provider, allows clients to arrange transportation on segments provided by the segment service provider. The segment service provider can provide scheduled segments between origins and destinations using a client membership model in which clients (e.g., members of the segment service provided by the segment service provider) provide a membership amount to be eligible to claim spots on the segments. The segment service provider can also allow the clients to initiate segments with custom attributes (e.g., custom departure date, origin, destination, and/or type of jet). For example, a client may want to travel from an origin to a destination on a day in which the scheduled segment(s) from the origin to the destination are full or on a day that no segments are scheduled from the origin to the destination. In this example, the client can initiate a segment from the origin to the destination for departure on the day and/or time that the client wants to travel. A client that initiates a segment is also referred to as a creator.

A client can initiate and manage segments, claim a spot on a segment, manage other travel arrangements with the segment management system 110, manage their profile, and/or perform other appropriate tasks related to the segment management system 110 using a client-side segment application 152 executed on the client's client device 150. The segment application 152 can transmit data to, and receive data from, the segment management system 110 over the network 170. The segment application 152 can be implemented as a native application developed for a particular platform or a particular device, web browser that provides a web interface, or another appropriate type of application. The segment application 152 can present and detect user interactions with various interfaces that allow the client to initiate segments, segments, and/or claim a spot on segments. The segment application 152 can be executed by the client device 150.

A client device 150 is an electronic device that is capable of requesting and receiving resources over the network 170. Example client devices 150 include personal computers, mobile communication devices, and other devices that can send and receive data over the network 170. A client device 150 typically includes a user application, such as a web browser or native application, to facilitate the sending and receiving of data over the network 170. The description that follows refers to a client device that interacts with the segment management system 110 using a native application, but the description that follows is equally applicable to interactions with web pages and/or other web-based resources.

The segment management system 110 includes one or more front-end servers 112 and one or more back-end servers 114. The front-end servers 112 can transmit data to, and receive data from the client devices 150, to and from operator systems 162 of operators 160, and to and from the service provider devices 140 over the network 170. For example, the front-end servers 112 can provide, to the application 152 of a client's client device 150, interfaces or data for presentation with the interfaces. The front-end servers 112 can also receive data specifying user interactions with the interfaces of the application 152, such as attributes of a conditional segment initiated by the client. As described in more detail below, the front-end servers 112 can update the interfaces, provide new interfaces, and/or update the data presented by the interfaces based on user interactions with the application 152.

The front-end servers 112 can also communicate with the back-end servers 114. For example, the front-end servers 112 can identify data that is to be processed by the back-end servers 114, e.g., data specifying a request to claim a spot on a segment and provide the identified data to the back-end servers 114. The front-end servers 112 can also receive, from the back-end servers 114, data for a particular client and transmit the data to the client device 150 of the particular client over the network 170.

The back-end servers 114 include a segment scheduling engine 116, a spot assessment engine 118, a segment sourcing engine 120, a route analytics engine 122, and a membership engine 124. As used herein, the term engine refers to a data processing apparatus that performs a set of tasks. The segment scheduling engine 116 manages the creation, confirmation, and/or cancellation of segments. The segment scheduling engine 116 can receive data specifying attributes of a segment initiated by a client and create the segment within the segment management system 110. For example, a client that uses a client device 150 can interact with the application 152 to initiate a segment and specify attributes of the segment. The attributes can include a departure geographic identifier (e.g., an origin city or airport code), a destination geographic identifier (e.g., a destination city or airport code), a departure date (which can include a date and/or time) at which the segment will depart from the origin, a type of jet (e.g., light, midsize, heavy, propeller, rotorcraft, etc.), and/or other appropriate attributes.

The segment scheduling engine 116 can receive the data and create the appropriate type of segment within the segment management system 110 based on the data and the attributes received from the client device 150. The segment scheduling engine 116 can also store the data for the created segment in a segment data storage unit 128. The segment data storage unit 128 can include one or more databases (or other appropriate data storage structures) stored in one or more non-transitory data storage media (e.g., hard drive(s), flash memory, etc.). The segment data storage unit 128 can store data for previously operated segments, segments scheduled by the segment service provider that have not yet departed, and/or client-initiated segments that have not yet departed. In some implementations, the stored data can include, for each segment, one or more of a type of aircraft selected for the segment, a departure date and/or time for the segment, the origin and destination of the segment, a number of spots on the segment, a number of spots claimed on the segment, the operator that will provide the selected aircraft, an amount provided by clients to claim a spot on the segment, how many of the spots were claimed using tokens, whether the segment is a scheduled segment that was scheduled by the segment service provider or a client-initiated segment, identifiers for each client that claimed a spot on the segment, identifiers for clients (and a number of clients) that actually boarded the segment if the segment has departed, and/or other appropriate data about the segment. For client-initiated segments, the data can also include an identifier of the client that created the segment and an amount submitted by the client to create the segment or obtain a spot on the segment.

The segment scheduling engine 116 can notify other clients of the created segment. In some implementations, clients can view the various segments from an origin to a destination. For example, the application 152 can present segments from an origin to a destination using a calendar interface. The calendar interface can include, for each date, zero or more segment indicators for each segment scheduled (or conditional) to travel from the origin to the destination on that date. Another client can claim a spot on the segment, e.g., using the application 152 executing on the client's device 150.

The spot assessment engine 118 can determine the required amount that must be submitted by a creator to create each candidate segment and/or the amount that clients are required to submit for each spot a segment. The required amount that must be submitted by the creator and/or the amount required for each spot can be based on various factors, such as the type of jet, the departure and destination geographic identifiers, the departure date, the duration of time between the time the segment is initiated and the departure date, the type of segment (e.g., conditional or confirmed), data stored in the segment data storage unit 128, and/or other appropriate factors.

The segment sourcing engine 120 can interact with the operator systems 162 of the operators 160 to select jets for the segments and obtain information about the jets (e.g., number of spots on the jet, costs for particular segments, range, flight time rates, etc.). For example, when the segment scheduling engine 116 creates a segment (e.g., a service provider scheduled segment or a client-initiated segment), the segment sourcing engine 120 can interact with the operator systems 162 to identify a jet of the same type as the created segment that can be used for the segment. For example, the segment sourcing engine 120 can submit a request to each operator system 162 for a jet of the type of the created segment. In response to receiving a request, the operator systems 162 can obtain data regarding available jets from their respective operator segment data storage units 164 and provide, to the segment sourcing engine 120 the information about any available jets that the operator 160 would be willing to operate for the created segment (e.g., number of spots on the jet, rates for particular segments, range, etc.). If multiple operators 160 have an available jet, the segment sourcing engine 120 can select a jet for the created segment based on the information provided by the operator systems 162.

In some implementations, the front-end servers 112 of the segment management system 110 communicate with the operators systems using application programming interfaces (APIs). The use of the APIs require computational power to communicate data. To reduce the amount of computational power used by the APIs, the segment management system 110 may identify a subset (e.g., less than all) of operators 160 for a particular segment and provide the request to only the operators in the subset. The segment management system 110 can identify the subset of operators based on the departure geographic identifier (e.g., identify operators that operate jets in the geographic area from which the segment will depart), previous segments provided by the operators (e.g., previously provided a jet for the same origin and destination), types of jets that the operator operates, and/or other appropriate criteria. In some implementations, communications with operators can be carried out using other communications means (e.g., phone). When the segment has been confirmed by the operator, the selected aircraft will be deployed to the origin at an appropriate time so that the selected aircraft will be available for any clients that have obtained spots (e.g., seats) on the created segment.

As sourcing and deploying an aircraft from a third party operator can take time, the segment service provider faces different challenges than typical commercial airlines that manage a large inventory of their own jets. For example, the segment service provider may have less flexibility in rescheduling segments and/or creating a new segment (e.g., to accommodate bumped overbooked clients). Thus, the unconventional metrics described herein can be critical to the segment service provider in optimizing the scheduling of the segments and ensuring that the clients' travel needs are being met.

The segment sourcing engine 120 can also store data related to operators in an operator data storage unit 130. The operator data for each operator can include data specifying each segment operated by the operator, each segment that the operator has been selected to operate but has not yet operated (e.g., scheduled segments for which the operator has been selected), and one or more rates for the operator. For example, the operator data for an operator can include a flight time rate (e.g., an amount per hour) the operator requires for each type of jet and/or each segment.

The membership engine 124 manages the membership of clients of the segment service provider. For example, the membership engine 124 can receive and process requests from potential clients to become members of the segment service provided by the segment service provider. The membership engine 124 can also maintain membership data for each client that becomes a member. The membership data can include a profile for each client. The profile for a client can include the name of the client, contact information for the client (e.g., an address and/or phone number), payment information, and/or other appropriate information related to the client. The profile for a client can also include a geographic identifier (e.g., name of a city, state, region, country, or other geographic identifier) for a primary geographic location for the client. The primary geographic location for the client can be a location of primary residence. For example, a client may have multiple residences, but may be requested to provide a geographic location (e.g., address) for a primary residence.

The membership data for each client can also specify a membership amount (e.g., payment amount) received from the client to become a member. The membership amount can be provided one time (e.g., a single initiation amount) and/or periodically (e.g., an annual amount). Clients may be required to provide the same membership amount or different membership amounts.

The membership data for a client can also include data identifying segments on which the client claimed a spot, if the client has claimed a spot on at least one segment. For example, a new client may have not yet claimed a spot or traveled on any segments. The membership data for each client can include, for each route, a number of times the client claimed a spot on a segment on the route. The membership engine 124 can store the membership data for each client in a membership data storage unit 132.

The route analytics engine 122 can extract (or otherwise obtain), aggregate, and analyze data regarding routes. For example, the route analytics engine 122 can determine one or more performance measures for each route based on the data for the route. Components of an example route analytics engine 122 are illustrated in FIG. 2 and described below.

The performance measures and other data related to segments, routes, etc. can be presented to the service provider by an analytics application 142 using one or more interfaces. The analytics application 142 can be implemented as a native application developed for a particular platform or a particular device, web browser that provides a web interface, or another appropriate type of application. The analytics application 142 can be executed by the service provider device 140. The service provider device 140 is an electronic device that is capable of requesting and receiving resources over the network 170. Example service provider devices 140 include personal computers, mobile communication devices, and other devices that can send and receive data over the network 170. Some example interfaces and performance measures generated by the route analytics engine 122 and presented by the analytics application 142 are illustrated in FIGS. 3-9 and described below.

Figure 2:
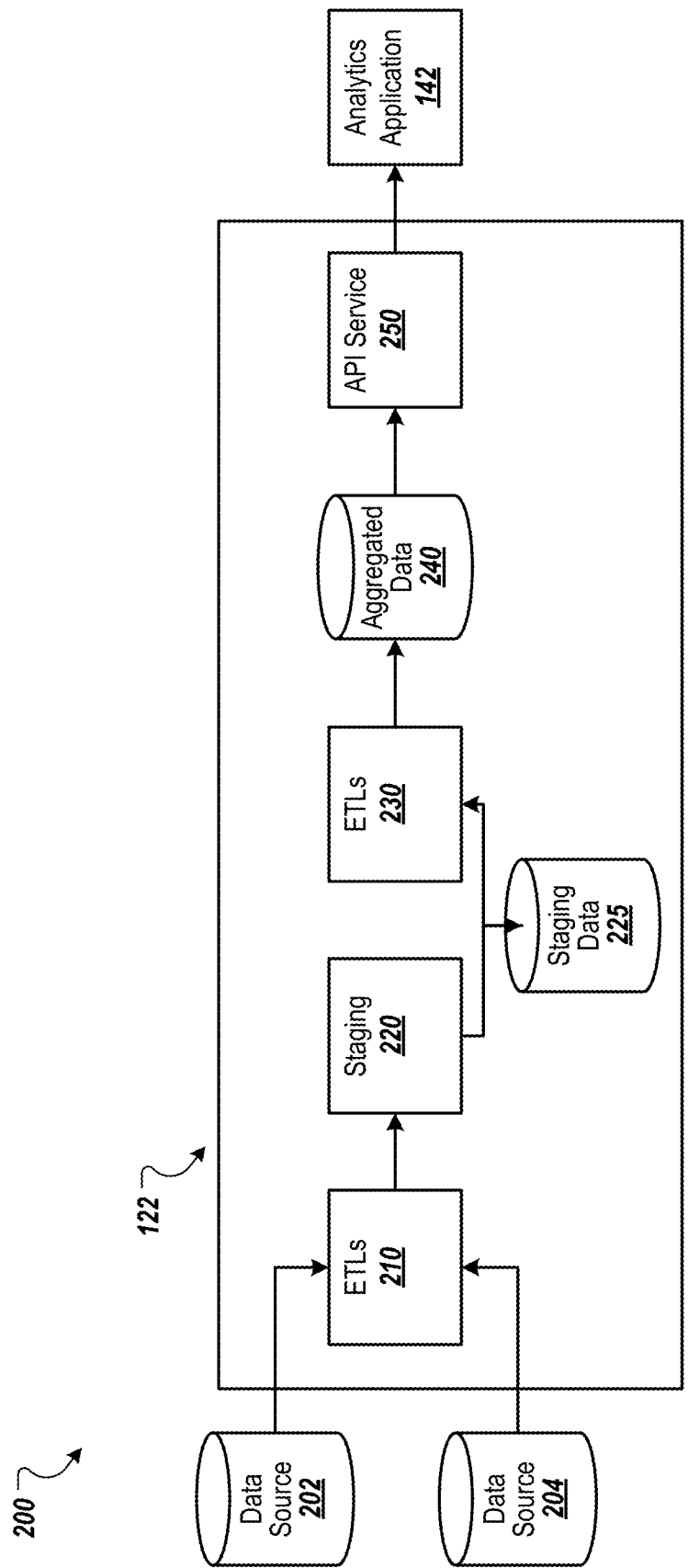
FIG. 2 is a block diagram of an example environment in which a route analytics engine processes data related to segments.

FIG. 2 is a block diagram of an example environment 200 in which a route analytics engine 122 processes data related to segments. In general, the route analytics engine 122 extracts, aggregates, and determines performance measures for routes and other metrics based on the data.

The route analytics engine 122 includes a first extract, transform, and load (ETL) module 210, which can be implemented on or by a data processing apparatus. The first ETL module 122 extracts data from multiple data sources, e.g., the data source 202 and the data source 204. The data sources can include databases, applications, networked resources (e.g., resources on a WAN or web resources on an Internet domain), and/or other appropriate data sources. Some example data sources include the segment data storage unit 128, the operator data storage unit 130, and the membership data storage unit 132. Other example data sources can include a database of client statements (e.g., that specify amounts received from clients for membership and/or to claim spots on segments), a database of operator statements (e.g., that specify details of segments operated by the operators and costs for the segments), etc.

The first ETL module 210 can be configured to extract particular data. For example, the first ETL module 210 can process a set of rules or other logic that causes the first ETL module 210 to extract the appropriate data from the appropriate data source. Each rule can be implemented as a script or other computer-executable code. For example, the first ETL module 210 can execute a script for extracting, from the segment data storage unit 128, data related to a particular segment.

In some implementations, the first ETL module 210 generates multiple data sets based on the extracted data. Each data set may be for an individual segment, an individual client, or an individual operator. Each data set may also be for a particular data domain (e.g., a particular purpose or business concern). For example, a first data set may include data related to spots (e.g., seats) of a particular segment (e.g., the total number of spots on the jet used for the segment, the number of those spots claimed, and/or the number boarded clients). A second data set may include data related to costs (e.g., a total amount for the segment, an estimated flight time for the segment, an operator rate for the segment, and/or data identifying the operator of the segment).

The first ETL module 210 can include one or more scripts (or other code) for each type of data set. For example, a first ETL script can extract, for each segment, the data related to spots of the segment from one or more data sources and generate a data set for each segment using the extracted data. A second ETL script can extract, for each segment, the data related to costs for the segment from one or more data sources and generate a data set for each segment using the extracted data.

The data sets generated by the first ETL module 210 can be based on the data presented in the interfaces illustrated in FIGS. 3-9 and described below. Each interface can present data for one or more data dimensions and, for each data dimension, one or more data items (e.g., facts, performance measures, etc.). The data dimension refers to the type of entity (or entities) for which the data is being presented (e.g., operator, route, route group, operator per route, route per region, membership, etc.). Each data set can include the data for one or more data dimensions and the type of data that will be presented (or used to generate other data presented) in an interface that presents data for the dimension.

The first ETL module 210 can also generate data sets for other types of data. For example, the first ETL module 210 can extract data for clients and generate one or more data sets for each client (e.g., with data related to membership amounts provided by the client, segments for which the client claimed a spot, etc.) and extract data for operators and generate one or more data sets for each operator (e.g., data related to segments operated by the operator, amounts or estimated amounts for the segments), etc.

The first ETL module 210 can also transform the data to a format suitable for analysis. For example, the data from each data source can be in different formats. In some implementations, the first ETL module 210 processes a set of rules or other logic to convert the data to a common format. The first ETL module 210 can also map each piece of data to an appropriate field for consumption by later stages. For example, the first ETL module 210 can process rules that cause the first ETL module 210 to identify, in an operator statement, a number of spots on a segment, a date the segment departed, an origin for the segment, a destination for the segment, a flight time for the segment, and/or other appropriate data, and map each piece of data to an appropriate field. In a particular example, the first ETL module 210 can map the number of spots to a "Number of Spots" field so that later stages can access the number of spots based on the mapped field.

The first ETL module 210 can extract data from the data sources periodically based on a specified time period. Each data item can include a time stamp that indicates a time at which the event occurred. For example, if a client claims a spot on a segment at a particular time, the data defining the claimed spot can include a time stamp that indicates the particular time. In this example, the first ETL module 210 can ignore data that has a time stamp that indicates a time prior to a previous data extraction by the first ETL module 210.

A staging module 220 (which can be implemented on or by a data processing apparatus) can transform the data sets into a format for aggregation by a second ETL module 230. In some implementations, the staging module 220 generates a table (or other data structure) for each data set. As described above each data set may be for an individual segment and for a particular data domain. A table for a data set for a segment and data domain can include columns and each column can include a particular type of data. For example, the table for a spots data set for a segment can include a first column for the total number of spots on the segment, a second column for the number of claimed spots on the segment, a third column for a number of boarded spots on the segment, a fourth column for the number of empty spots on the segment, etc.

Each table can also include data specifying the segment corresponding to the table, the departure date for the segment, the origin for the segment (e.g., a geographic identifier for the origin), the destination for the segment (e.g., a geographic identifier for the destination), and/or other appropriate data for the segment. In this way, the second ETL module 230 can identify the tables that include appropriate data for aggregating (e.g., the segments that belong to a particular route and that departed during a particular time period).

The staging module 220 can include scripts (or other code) that extracts the data from the data sets and generates the tables. The staging module 220 can store the tables in a staging data storage unit 225 (e.g., one or more databases) for retrieval by the second ETL module 230.

The second ETL module 230 (which can be implemented on or by a data processing apparatus) can extract data from the staging data storage unit 225 and aggregate the data based on a set of rules or other logic. In some implementations, the second ETL module 230 aggregates the data based on data dimensions, time periods, and/or other characteristics to increase a speed at which performance measures and other metrics are determined and to increase a speed at which data is presented at the interfaces.

For example, as described below, a performance measure can be determined for each route for which a segment service provider provides segments. The second ETL module 230 can extract data from the staging data storage unit 225 related to the route and aggregate the data for one or more time periods (e.g., for each of one or more weeks, for each of one or more days of the week, for each year, for each month, etc.). The data can be aggregated for each of multiple segment characteristics. For example, the aggregated data for the route can include a total number of spots on the segments for the route during the time period, the number of those spots that were claimed, the number of those spots that were empty (e.g., not claimed), the number of clients that actually boarded the segments, and/or other data used to determine a metric or presented in an interface illustrated in FIGS. 3-9 and described below.

The second ETL module 230 can include scripts that aggregate data items for each data dimension (or a combination of dimensions) during specified time periods. For example, a script may extract and aggregate (e.g., determine a sum or other combination metric) data related to spots for each route for a first time period (e.g., each month) and store the aggregated data in an aggregated data storage unit 240 (e.g., in a database with a label or field that identifies the aggregated data one or more databases). For example, the first script may determine, for each route, a total number of spots that were on the segments for the route that departed during the timer period, a total number of claimed spots on those segments, and a number of boarded clients on those segments. A second script may extract and aggregate data related to spots for each route for a second time period (e.g., each year) and store the aggregated data in the aggregated data storage unit 240.

To extract and aggregate data, the second ETL module 230 identifies the appropriate tables (e.g., the tables that correspond to the appropriate segments) and, within each table, the appropriate columns from which to extract data. For example, a route can include multiple airports at each geographic location of the route. In a particular example, the route between Springfield and Greenville can include several airports for Springfield (e.g., in or near Springfield) and several airports for Greenville (e.g., in or around Greenville). To aggregate data related to spots for this route during a particular month, the second ETL module 230 can identify tables that include data specifying a geographic identifier for Springfield (e.g., an airport code for Springfield), a geographic identifier for Greenville (e.g., an airport code for Greenville), and a departure date that is within the particular month.

The second ETL module 230 can identify, within each identified table, the appropriate columns that include data related to spots, extract the data from the appropriate columns, and aggregate the data. For example, the second ETL module 230 can identify, within each identified table, a column that includes data specifying a total number of spots on the segment corresponding to the table. The second ETL module 230 can identify this column in each of the identified tables, extract the total number of seats value from each identified table, determine a sum of the extracted values, and store the sum in the aggregated data storage unit 240 (e.g., in a designated place for the total number of spots on segments for the route during the month).

Figure 11:
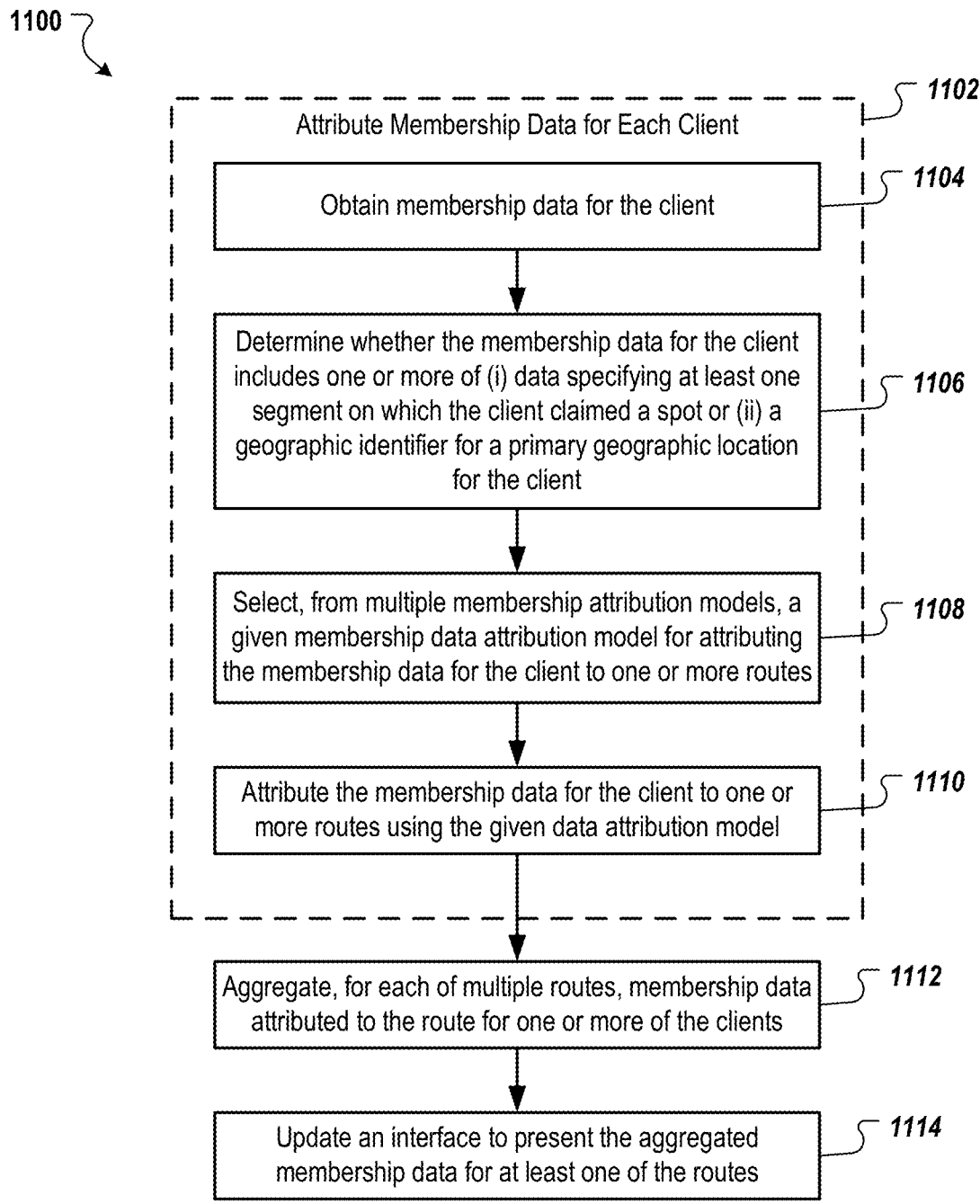
FIG. 11 is flow chart of an example process for attributing membership data to routes and updating an interface to present the attribution.

For example, the aggregated data may be stored in a database that includes a table for each interface and each time period that can be presented at the interface. In this example, the table can include a row for each route and a column for each portion of aggregated data for the interface (e.g., a column for total number of spots, total number of claimed spots, total number of boarded clients, etc.). In another example, as described below, the performance of a route can be based on membership amounts of clients that have been attributed to the routes. The second ETL module 230 can attribute the membership amounts to the routes and aggregate the amounts for each route. An example process for attributing membership amounts to routes is illustrated in FIG. 11 and described below.

By aggregating the data in advance (e.g., prior to receiving a request for the data), performance measures and other metrics that are based on the aggregated data can be determined faster and more efficiently. In addition, the aggregated data and/or metrics can be presented with reduced latency.

An API service module 250 (which can be implemented on or by a data processing apparatus) can query data from the aggregated data storage unit 240 and provide the data for presentation by the analytics application 142, e.g., in response to requests (e.g., queries) received from the analytics application 142. The API service module 240 can also determine (e.g., compute) performance measures and other metrics in response to a request.

For example, a user may use the analytics application 142 to navigate to an interface that presents data for a particular route. The request may specify the particular route and/or data that will be presented in the interface. In response, the API service module 240 can identify the data that will be presented in the interface, query the appropriate data from the aggregated data storage unit 240, and provide the data to the analytics application 142.

If the interface will be presenting a performance measure or other metric that has not been computed and stored in the aggregated data storage unit 240, the API service module 240 can determine the metric and provide the determined metric to the analytics application 142. For example, the data for some metrics may be updated often. To ensure that the metrics are accurate, the API service module 240 can compute the metrics at query time (e.g., in response to a query) using pre-aggregated data.

FIGS. 3-9 are screen shots of example interfaces and performance measures that can be generated by the route analytics engine 122 and presented by the analytics application 142. The data presented in the screen shots has been created for the purposes of illustrating an example and does not represent data for actual segments or data for an actual segment service provider.

FIG. 3 is a screen shot of an example interface 300 that presents aggregated analytical data for route groups. The interface 300 can be presented by the analytics application 142 of FIG. 1 using data obtained from the segment management system 110 of FIG. 1. The interface 300 includes a summary of data for various groups of routes for which a segment service provider provides segments. In this example, the routes are grouped by geographic region (e.g., by origin, destination, or both) and events (e.g., Holiday travel). In other examples, the routes may be grouped by other criteria, such as flight time, flight length, size of jet, type of jet, etc.

The interface 300 includes a table 320 of data and a date range selector element 310 that enables a user (e.g., a segment scheduling manager or administrator) to select a date range for the data. When a user adjusts the date range using the date range selector element 310, the interface 300 can update the data in the table 320 to present data for the updated date range. For example, the analytics application 142 can send a request for the data to the segment management system 110 and present the data received from the segment management system 110 in the table 320.

The table 320 includes, for each route group, data regarding segments operated or scheduled to operate along the routes in the route group during the date range specified using the date range selector element 310. For past time periods (e.g., months that occurred before a current month for which data is being presented), the data for the route groups include data for segments that were operated during the date range. For future time periods (e.g., weeks that will occur after a current week for which data is being presented), the data for the route groups include data for segments scheduled (e.g., by the segment service provider and/or clients) to operate during the date range. For a date range that includes dates before and after a current date, the data for the route groups can include data for both segments that have been operated and for segments scheduled to operate. For brevity, the table 320 will generally be described with reference to segments that have operated. However, similar data can be presented for segments that are scheduled to operate.

The table 320 includes a total spots column 321 that includes, for each route group, data specifying a total number of spots (e.g., seats) on segments for the route group (e.g., segments operated along the routes in the route group) during the date range and a total spots claimed column 322 that includes, for each route group, a total number of spots claimed among the total number of spots. In the illustrated example, the table 320 indicates that the segments for the routes in the East Coast region group have a total number of 2781 spots for the month of March, 2018 and that, of those 2781 spots, 2134 have been claimed. The total number of spots for a region group can be determined by identifying each segment for the region group and the date range (e.g., the segments operated along the routes of the route group during the date range), identifying a number of spots on each identified segment, and determining a sum of the identified number of spots. Similarly, the total number of spots claimed for a region group can be determined by identifying each segment for the region group and the date range, identifying a number of spots that have been claimed on each identified segment, and determining a sum of the identified number of spots.

The table 320 also includes a load factor column 323 that includes, for each route group, data specifying a load factor for the route group. The load factor for a route group represents the percentage of the total number of spots on the segments for the route group that have been claimed. The load factor for a route group (or route or segment) can be determined by dividing the number of claimed spots by the total number of spots and multiplying the result by 100. For the East Coast, the load factor is 77% (i.e., 2134/2781*100).

The table 320 also includes a boarded clients column 324 that includes, for each route group, data specifying a number of clients that boarded the segments for the route group during the date range. For example, a client may claim a spot on a segment, but may not actually show up for the segment. In this example, the number of boarded clients would be less than the number of claimed spots. The number of clients that boarded the segments for a route group can be determined by identifying the segments for the region group, identifying, for each segment, a number of clients that boarded the segment, and determining a sum of the identified number of clients that boarded the identified segments. In this example, 2087 of the 2134 claimed spots on segments for the East Coast region group during the date range had a person actually board the segment for the claimed spot.

No-shows are a unique problem in a private jet membership environment because a segment service provider cannot overbook a segment like typical commercial airlines. For example, commercial airlines typically provide multiple flights per day (or at least provide flights on consecutive days) on their routes which allows the airlines to move passengers without causing great inconveniences. In contrast, private jets for a route may only be scheduled for a couple of flights per week. If one of the segments is overbooked and each client arrives to board the segment, one or more clients may have to wait days for the next segment, which may also be full. Providing alternative transportation may also be difficult for a segment service provider as the provider would have to source another private jet in a short amount of time.

The number of boarded passengers is an unconventional metric that can be compared to the number of claimed spots to determine how clients are using the service. For example, as a member of the service, a client may be able to claim spots on at least some segments for free. If clients are reserving spots on segments without actually traveling on the segment, this can be important information for the segment service provider to know as this prevents other clients from traveling in those spots.

The table 320 also includes a creator claimed spots column 325 that includes, for each route group, data specifying a number of spots claimed by creators (e.g., clients that initiated a custom segment) on the segments for the route group during the date range. For example, a creator can claim a spot for the creator and additional spots for other people. This column 325 allows a user to quickly compare the number of spots being claimed by creators relative to the total number of claimed spots in each of the route groups. The number of spots claimed by creators for a route group can be determined by identifying the segments for the route group, identifying, for each segment, a number of spots on the segment claimed by the client that initiated the segment, and determining a sum of the identified number of spots. In this example, 184 of the 2781 total spots on segments for the East Coast region group during the date range were claimed by creators of client-initiated segments.

The number of spots claimed by creators for a route group can also be used to determine other metrics, e.g., as a percentage of spots claimed by the creators for a route groups (e.g., number of spots claimed by the creators for a route group divided by the total number of spots for the route group) or a ratio between the number of spots claimed by creators and the number of spots claimed by other clients. The number of spots claimed by other clients can be determined by subtracting the number of spots claimed by creators from the total number of spots for the route group.

The metrics related to spots claimed by creators is a new measurement that requires the creation of new data specifying the number of spots claimed by creators that did not exist prior to the new private jet travel service that allows clients to create and customize flights that will be provided by a segment service provider different from the client. Thus, the segment management system 110 performs a measurement technique to count the number of spots claimed by creators that creates new data that did not previously exist.

The table 320 also includes an empty spots column that includes, for each route group, data specifying a number of empty spots on the segments for the route group during the date range. For past date ranges, the number of empty seats represent the number of spots that were not claimed on the segments operated during the date range. A spot that was claimed, but the client did not board may not be counted as an empty seat. For future date ranges, the number of empty spots represent the number of spots that may be claimed but that have not yet been claimed. For date ranges that include operated segments and scheduled segments, the number of empty seats can represent the number of seats that were not claimed on the operated segments in combination with the number of spots available on the scheduled segments. The number of empty spots on the segments for the route group during the date range can be determined by identifying the segments for the region group, identifying, for each segment, a number of empty spots on the segment, and determining a sum of the identified number of empty spots. In this example, 647 of the 2781 total spots on segments for the East Coast region group during the date range were empty.

The table 320 also includes a total segments column 327 that includes, for each route group, data specifying a total number of segments for the route group that departed during the date range, a scheduled segments column 328 that includes, for each route group, data specifying a number of segments for the route group that were scheduled by the segment service provider for departure during the date range, and a client-initiated segments column 329 that includes, for each route group, data specifying a number of segments for the route group that were initiated by clients and scheduled to depart during the date range. These columns allow a user to quickly compare the relative number of segments that are being scheduled by the segment service provider and by clients across each of the route groups. For example, a user can quickly identify which route groups are popular for client-initiated segments as compared to other route groups. Similar to the number of spots claimed by creators, the number of client-initiated segments is a measurement based on newly created data (e.g., a count of the number of segments initiated by clients rather that service providers) that did not previously exist.

The number of total number of segments for the route group during the date range can be determined by identifying the segments for the region group that departed during the date range and determining a total number of the identified segments. Similarly, the number of segments for the route group that were scheduled by the segment service provider can be determined by identifying the segments for the route group that departed during the date range and that were scheduled by the segment service provider, and determining a number of the identified segments. The number of segments for the route group that were initiated by clients can be determined by identifying the segments for the route group that departed during the date range and that initiated by clients, and determining a number of the identified segments. In this example, the East Coast route group included 45 service provided scheduled segments and 264 client-initiated segments for a total of 309 segments for the date range.

The table 320 also includes a scheduled segment amount column 330 that includes, for each route group, data indicating an amount for the segments scheduled by the segment service provider for the route group during the date range. The amount can represent an amount of revenue received for the segments scheduled by the service provider for the route group during the date range. This amount can be based on a total amount received (or that is expected to be received) from clients that have claimed a spot on segments for the route group that were scheduled by the segment service provider to depart during the date range. For example, a client may be required to provide an amount to claim a spot on an individual segment. This amount can be determined by identifying the segments for the route and the date range that were scheduled by the service provider, identifying, for each identified segment, a total amount received (or expected to be received) for the spots on the segment, and determining a sum of the identified total amounts. In this example, the segment service provider received (or expects to receive) an amount of 906 (e.g., $906) for the 45 service provider scheduled segments scheduled to depart during the date range.

The table 320 also includes a client-initiated segment amount column 331 that includes, for each route group, data indicating an amount for the segments initiated by clients for the route group during the date range. The amount can represent an amount of revenue received for the segments initiated by the clients for the route group during the date range. This amount can be based on a total amount received (or that is expected to be received) from clients that have claimed a spot on segments for the route group that were initiated by clients and that departed (or are scheduled to depart) during the date range. For example, the creator may be required to provide an amount to initiate a segment. Similarly, each other claim that wants to claim a spot on a client-initiated segment may be required to provide an amount to claim a spot on the segment. The amount in column 331 can be determined by identifying the segments for the route and the date range that were initiated by clients, identifying, for each identified segment, a total amount received (or expected to be received) for the spots on the segment, and determining a sum of the identified total amounts. In this example, the segment service provider received (or expects to receive) an amount of 13,253 for the 264 client-initiated segments that departed (or are scheduled to depart) during the date range.

Similar to the number of spots claimed by creators, the amount received for client-initiated segments is a measurement based on newly created data (e.g., amounts received for client-initiated segments) that did not previously exist. The interface 320 allows users to view and compare unconventional data regarding client-initiated segments and service provider scheduled segments, which would not be applicable to airlines that schedule all of their flights themselves. A unique challenge to segment service providers that operate using a membership model that allows clients to initiate custom segments is evaluating how clients are using the service and optimizing segments scheduling based on the evaluation. For example, if a segment scheduling manager determines that the number of client-initiated routes on a particular segment greatly outnumber the number of segments scheduled by the segment service provider, the segment scheduling manager may schedule more segments on the route or used larger jets on the route.

The table 320 also includes a total amount column 332 that includes, for each route group, data indicating a total amount for the segments for the route group during the date range. This amount represents a sum of the total amount received (or that is expected to be received) from clients that have claimed a spot on segments for the route group that were scheduled by the segment service provider to depart during the date range and the total amount received (or that is expected to be received) from clients that have claimed a spot on segments for the route group that were initiated by clients and that departed (or are scheduled to depart) during the date range. For example, the total amount for a route group can be the sum of the amount in column 330 for the route group and the amount in column 331 for the route group. In this example, the total amount for the East Coast route group is 14,159 (i.e., 906+13,253).

In this example, the amounts are based on per-spot amounts received for the segments. In other examples, the amounts may be based on an attribution of membership amounts provided by the clients. For example, as described below, the membership amounts can be attributed to routes based on the membership data for the clients. The membership amounts for each route can then be attributed to individual segments. The amount attributed to each segment can then be used to determine the total amount for service provider scheduled segments in column 330.

Although the table 320 presents data for route groups, similar data can be presented for individual routes within the route groups and/or individual segments for each route. For example, the table 320 can include an interface control element 333 for each route group. In response to receiving data specifying an interaction (e.g., selection) of the interface control element 333, the analytics application 142 can request and present data related to individual routes of the route group. For example, the analytics application 142 can present the data in another interface, e.g., the interface 400 illustrated in FIG. 4 and described below. In another example, the analytics application 142 can expand the row for the row group and present the individual routes of the route group and the data for the individual routes of the route group below the route group.

The interface 300 allows a user to quickly assess the performance of the segments across all regions quickly without having to navigate to multiple interfaces to obtain the necessary data, e.g., without having to navigate to a different interface for each route group for each route, or for each segment. The interface 300 also provides the most relevant information for each route group, e.g., the load factor that indicates the demand of the routes relative to supply, the relative number of segments that are client-initiated rather than scheduled which indicates whether clients are creating inventory for the routes and the demand for additional segments on the routes, and the overall performance of the routes in terms of the total amount received for the routes. The total amounts at the bottom of the table 320 provides a quick summary of all segments and routes provided by the segment service provider.

Figure 4:
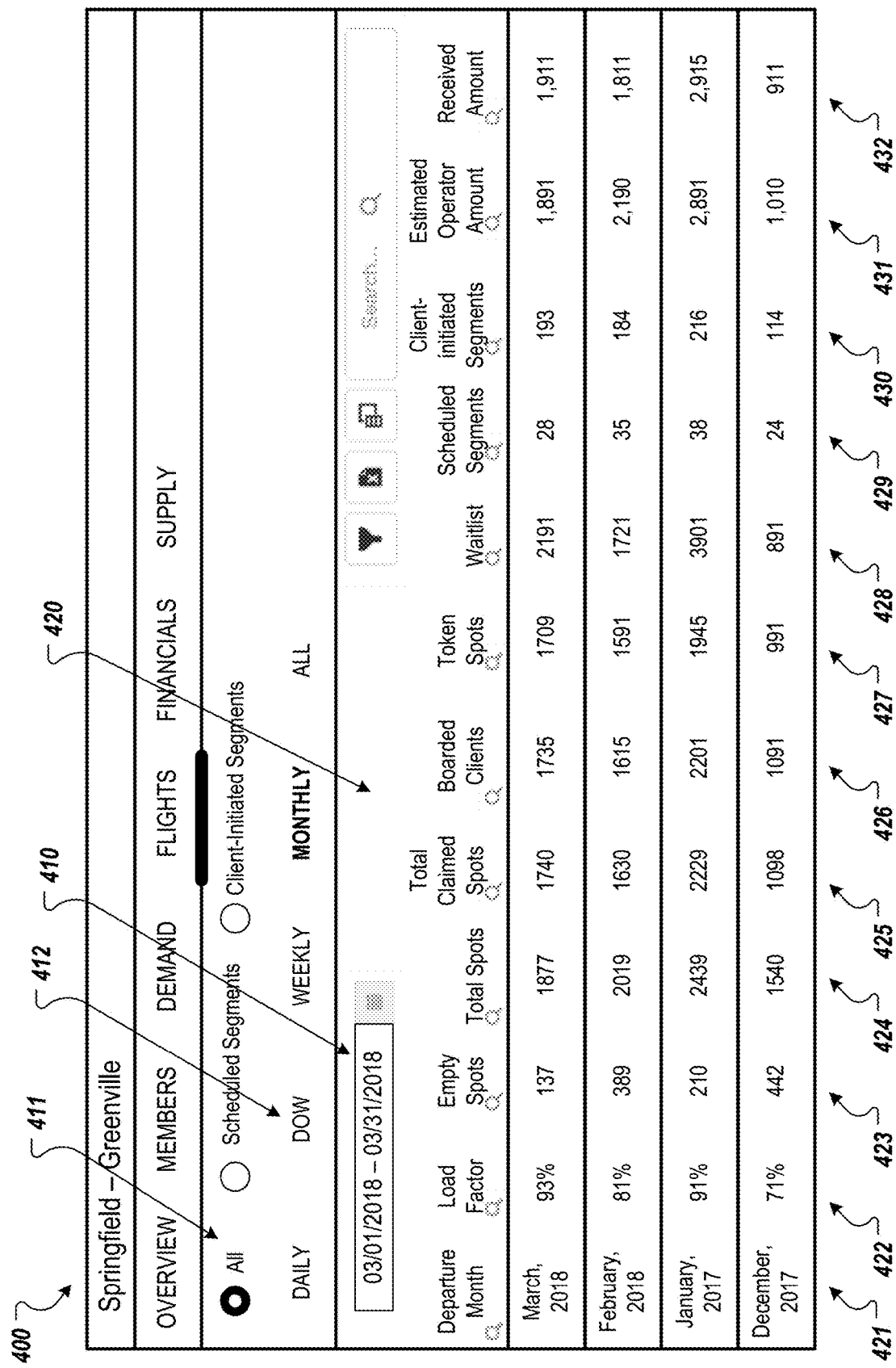
FIG. 4 is a screen shot of an example interface that presents analytical data for a route.

FIG. 4 is a screen shot of an example interface 400 that presents analytical data for a route. In this example, the interface 400 presents analytical data for the route between Springfield and Greenville. In some implementations, the data for the route includes the total amounts for both directions of the route, i.e., segments from Springfield to Greenville and segments from Greenville to Springfield. In some implementations, the data for the route is presented for each direction individually. Similarly, the data for a route can include data for segments that depart from and land in multiple different airports along the route. For example, the data for the Springfield and Greenville route can include data for segments that depart from and land in multiple airports in the Springfield area.

The interface 400 includes a table 420 of data and a date range selector element 410 that enables a user to select a date range for the data. When a user adjusts the date range using the date range selector element 410, the interface 400 can update the data in the table 420 to present data for the updated date range. For example, the analytics application 142 can send a request for the data to the segment management system 110 and present the data received from the segment management system 110 in the table 420.

The interface 400 also includes segment type selector element 411 that enables a user to select the type of segments for which data is presented in the table 420. In this example, a user can use the segment type selector element 411 to view data for all types of segments that provide service for the route, data for segments scheduled by the segment service provider, or data for segments initiated by clients, e.g., by selecting the appropriate radio button of the segment type selector element 411. The screen shot of FIG. 4 illustrates example data for all types of segments that provide service for the Springfield-Greenville route.

The interface 400 also includes a time interval selector element 412 that enables a user to select the time periods for which data is aggregated and presented in the table 420. In this example, the user can use the time interval selector element 412 to view daily data, day of the week (DOW) data, monthly data, or all data (e.g., aggregated data for the entire history of the route). The screen shot of FIG. 4 presents monthly data, i.e., for months leading up to and including the month specified by the date range selector element 410. In this example, the date range selector element specifies the month of March, 2018 and the table presents data for each month between December, 2017 and March, 2018.

The table 420 includes a time interval column 421 that includes, for each time interval, data specifying the time interval for which data in its row is being presented. The table 420 also includes a load factor column 422 that includes, for each time interval, data specifying the load factor for segments for the route that departed during the time interval. As described above, the load factor for a route can be determined by dividing the number of claimed spots for the route by the total number of spots for the route. For example, the load factor for March, 2018 is 93% based on a 1740 spots of a total 1877 spots on segments that departed in March, 2018 for the route being claimed by clients (i.e., 1740/1877*100).

A segment scheduling manager (or other user) can compare the load factor for segments scheduled by the service provider with the load factor for client-initiated segments for each time period using the segment type selector element 411. This allows the segment scheduling manager to determine how clients are using the different types of segments. For example, the segment scheduling manager may notice that the load factor for client-initiated segments is higher than the load factor for service provider scheduled segments. In this example, the segment scheduling manager may optimize the route by scheduling segments at the date and time that clients are initiating segments rather than the previous times as clients have indicated that they prefer flights at different dates or times.

The new load factor measurement for client-initiated segments require new measurement techniques to create new data (e.g., the number of spots on client-initiated segments and number of claimed spots on client-initiated segments) that did not previously exist. For example, the segment management system 110 can aggregate, for each route, the number of spots on client-initiated segments and the number of claimed spots during a time period using the data for each individual client-initiated segment that operated on the route during the time period.

Similar to the table 320 of FIG. 3, the table 420 also includes an empty spots column 423 that presents, for each time interval, a number of empty spots on segments for the route that departed during the time interval; a total spots column 424 that presents, for each time interval, a total number of spots on the segments for the route that departed during the time interval; a total claimed spots column 425 that presents, for each time interval, a number of spots claimed on the segments for the route that departed during the time interval; and a boarded clients column 426 that presents, for each time interval, a number of clients that actually boarded the segments for the route during the time interval. In this example, the table 420 indicates that the Springfield-Greenville route had 1877 spots that could be claimed on segments departing in March, 2018. Of those 1877 spots, 137 were empty (not claimed), 1740 were claimed, and 1735 of the spots were actually occupied.

The table 420 also includes a token spots column 427 that includes, for each time interval, data specifying the number of the claimed spots for segments that departed during the time interval and that were claimed with tokens, e.g., instead of or in addition to a payment amount. For example, the segment service provider may provide tokens to clients that the clients can use to claim a spot on a segment. The number of claimed spots that were claimed with tokens can be determined by identifying the segments for the route that departed during the time interval, identifying the number of spots on each identified segment that were claimed using a token, and determining a sum of the identified numbers of spots.

The table 420 also includes a waitlist column 428 that includes, for each time interval, data specifying the number of waitlist events that have occurred for segments of the route that departed during the time interval. A waitlist event refers to a client adding themselves to a segment that is full. If a spot becomes available, a client on the waitlist may be added to the segment. A client can produce multiple waitlist events for a route during a time interval. For example, a client that has flexible travel needs can join a waitlist to full segments that depart on different days in the hopes that a spot on one of the segments becomes available. The number of waitlist events for the route and a time interval can be determined by identifying the segments for the route that departed during the time interval, identifying, for each identified segment, a number of waitlist events that occurred for the identified segment, and determining a sum of the identified number of waitlist events.

The table 420 could also present an average number of waitlist events per segment during the time interval. This allows a user (e.g., a segment scheduling manager) to quickly identify how many clients would like to join a segment along the route on average but cannot due to the segment being full. This allows the user to optimize the scheduling of segments, e.g., by adding, removing, or using different size jets for the segments.

The table 420 also includes a scheduled segments column 429 that includes, for each time interval, data specifying the number of segments scheduled for the route by the segment service provider that departed during the time interval and a client-initiated segments column 430 that includes, for each time interval, data specifying a number of client-initiated segments for the route that departed during the time interval. In this example, there were 28 segment provider scheduled segments that traveled along the Springfield-Greenville route in March, 2018 and 193 client-initiated routes that traveled along the Springfield-Greenville route in March, 2018.

The table 420 also includes an estimated operator amount column 431 that includes, for each time interval, data specifying a total expected operator amount (e.g., cost) for operating the segments for the route for that time interval. The estimated operator amount can be difficult to determine in a private jet service environment in which third party operators operate the jets used for the segments. For example, the amounts required by each operator may differ and may be determined based on different factors that are not known to the segment service provider. In contrast, a typical commercial airline provides its own jets and pilots and therefore used known fixed costs to determine the cost of a segment. The total expected operator amount for a time interval can be determined by identifying the segments for the route that departed during the time interval, determining an estimated operator amount for each identified segment, and determining a sum of the estimated operator amounts for each identified segment.

The estimated operator amount for an individual segment can be determined based on an estimated flight time for the segment and a flight time rate (e.g., hourly rate) for the segment. For example, the estimated operator amount for the segment may the product of the estimated flight time for the segment (e.g., in terms of hours) and the flight time rate (e.g., hourly rate). The flight time rate may be based on the operator, the type of jet selected for the segment, and/or the route. For example, each operator may have specified flight time rates for each type of jet and/or each route. In another example, the segment management system 110 may store previous rates required by the operators for particular types of jets and/or particular routes in the operator data storage unit 130. The most recent (or an average rate) required by an operator for the particular type of jet selected for a segment and/or the route on which the segment will travel can be used as the flight time rate for the segment.

The estimated flight time for a segment can be based on historical data for flights from the origin of the segment to the destination of the segment. For example, the estimated flight time may be an average of the flight times for previous flights from the origin to the destination using the same jet as the segment or the same type of jet as the segment.

Although an estimated operator amount in this example, the actual operator amount can be presented in column 431. For example, the actual operator amount may be received from the operator (e.g., in the form of a request). In this example, the actual operator cost for a time interval for a route can be the sum of the actual operator cost for each segment for the route that departed during the time interval.

The table 420 also includes an amount received column 432 that presents, for each time interval, an amount received for the route during the time interval. The amount received for a time interval can be an amount received from clients that claimed a spot on the segments for the route that departed during the time interval. For example, the amount received for a time interval can be an amount of revenue for the segments for the route that departed during the time interval. The amount received for a time interval can be determined by identifying the segments for the route that departed during the time interval, identifying an amount received from clients to claim a spot on each identified segment, and determine a sum of the identified amounts, similar to the way the amounts in columns 330-332 of FIG. 3.

FIG. 5 is a screen shot of an example interface 500 that presents day-of-the-week analytical data for a route. The example interface 500 includes a table 520 that includes similar data as the table 420 of the interface 400 of FIG. 4, but for days of the week rather that for each month. For example, the analytics application 142 can present the interface 500 in response to a selection of "DOW" in the time interval selector element 412 of the interface 400.

The table 520 includes a day of the week column 521 that includes data specifying the days of the week and a route direction column 522 that includes data specifying the direction of the routes. In this example, the table 520 presents the data for each day of the week separate for each route direction. In particular, the table 520 includes a respective row of data for the direction from Springfield to Greenville for each day of the week and a respective row of data for the direction from Greenville for each day of the week. In other examples, the data for both directions for each day of the week can be aggregated and presented in a single row for the day of the week.

The data for each route direction and each day of the week is based on data for segments for the route that departed on the day of week in the route direction over the duration of the date range specified by the date range selector element 510 (which can be the same as the date range selector element 410 of FIG. 4). For example, the first two rows present data for segments that departed on the route on Sundays in the month of March, 2018. The first row include the data for the segments that traveled from Springfield to Greenville on Sundays in March, 2018. The data for the first row can be determined by identifying the segments that departed from Springfield to Greenville on each Sunday of March 2018, identifying the appropriate data for each identified segment (e.g., the number of empty seats for each identified segment for the column that presents the number of empty seats, and aggregating (making a calculation) using the identified data.

For example, to determine the total number of spots for the first row, the segments that traveled from Springfield to Greenville on a Sunday in March, 2018 can be identified. For each identified segment, the number of spots on the segment can be identified. The total number of spots on the identified segments can then be determined by determining the sum of the number of spots for the identified segments.

The day of the week data in the table 520 can be used to optimize segment scheduling. For example, if the load factor and/or number of waitlist events for a day of the week is high (e.g., greater than a threshold), the segment service provider may want to schedule more segments (or use larger jets) on that day to accommodate the demand. Similarly, of the load factor and/or number of waitlist events for a day of the week is low (e.g., less than a respective threshold), the segment service provider may want to reduce the number of scheduled segments (or use smaller jets) on that day.

Figure 6:
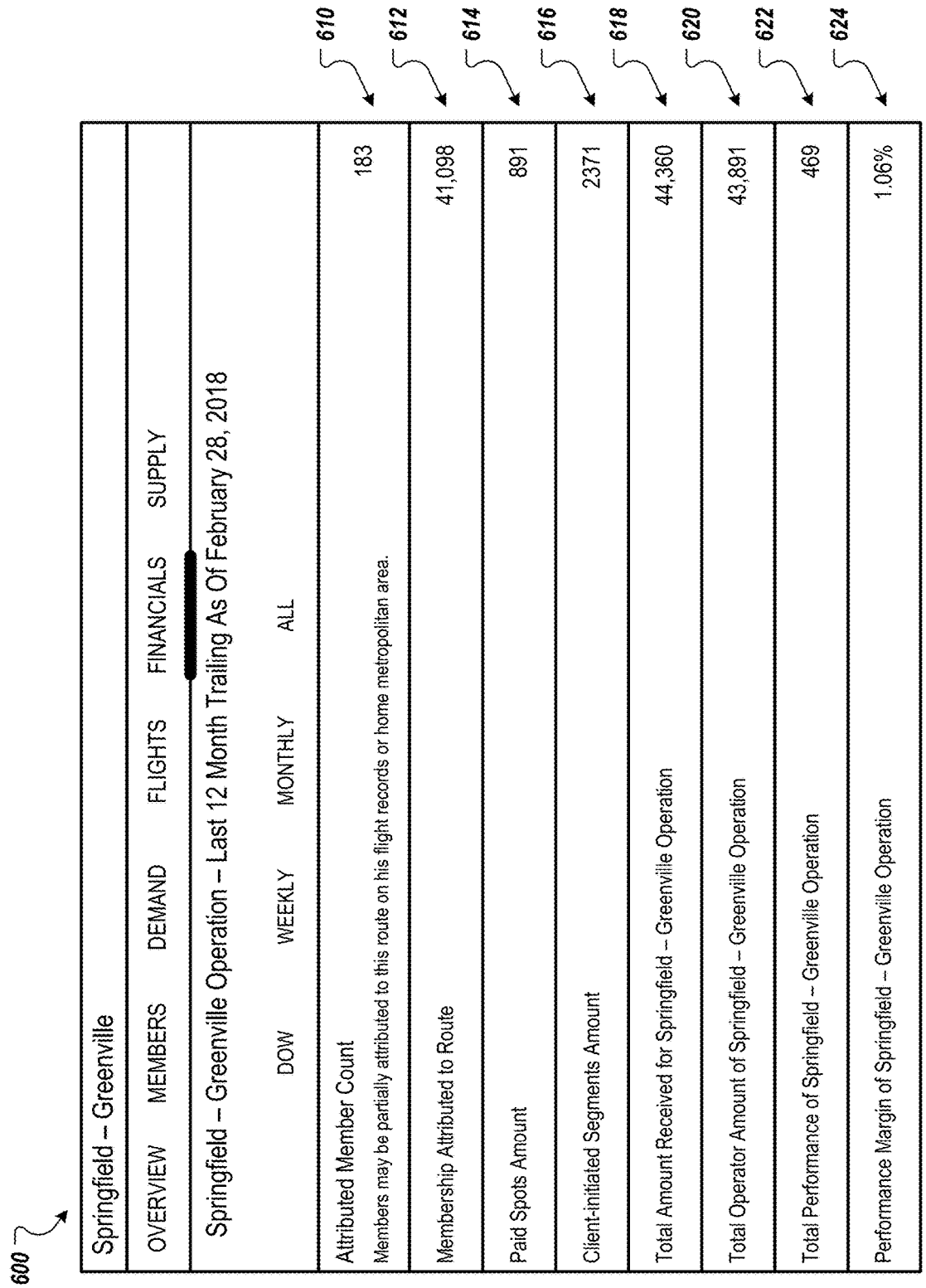
FIG. 6 is a screen shot of an example interface that presents analytical data for a route.

FIG. 6 is a screen shot of an example interface 600 that presents analytical data for a route. The interface 600 provides a summary of analytical data for the route between Springfield and Greenville. In particular, the interface 600 presents data specifying an attributed member count for the route 610 and a membership amount attributed to the route 612. The attributed member count for the route 610 refers to the number of clients for which at least a portion of their member amount has been attributed to the route. The membership amount attributed to the route 612 refers to the total amount attributed to the route from the those member amounts. In this example, at least a portion of the membership amounts received from 183 clients has been attributed to the Springfield-Greenville route and the sum of the 183 clients' amounts attributed to the Springfield-Greenville route is 41,098.

In some implementations, a client provides a membership amount periodically, e.g., once a year. The date on which each client provides their respective amount can vary, e.g., based on the date the client became a member of the segment service provided by the segment service provider. In this example, the interface 600 can present data for the previous twelve months from a particular date, e.g., the current date on which the interface 600 is being presented. The interface 600 can also enable users to view the same data for other time periods, e.g., the year prior to the previous twelve months. When a membership amount is received from a member, the amount can be attributed to one or more routes.

Determining which clients' membership amounts to attribute to which routes and the amounts to attribute to each route can be difficult in a private jet membership environment due to lack of information for some clients and the changing travel patterns of individual clients. The membership attribution techniques described herein provide new measurements (e.g., a total amount of membership attributed to a route) based on new data (e.g., a portion of a client's membership to a route) that did not previously exist outside a private jet membership environment. As described below, a customized model can be selected for each group of clients for which specified types of data are available. This allows the membership amounts to be attributed accurately in view of the lack of information for some clients.

The membership amount of each client can be attributed to one or more routes for which the segment service provider provides segments using a set of membership data attribution models. As described above, the appropriate membership data attribution model can be selected on a per-client basis based on the type of membership data available for the client, e.g., in the membership data storage unit 132. Each membership data attribution model can include a respective set of rules for attributing the membership amount received from a client to one or more routes. An example process for attributing membership amounts received from clients is illustrated in FIG. 11 and described below.

The interface 600 also presents a paid spots amount 614 that is an amount received for individual spots on segments for the route over the past twelve months. For example, a client may be required to provide an amount to claim a spot on some segments in addition to the membership amount. The paid spots amount 614 can be determined by identifying the segments that operated on the route for the past twelve months, identifying a total amount received for individual spots on each identified segment, and determining a sum of the identified total amounts. This amount can be limited to segments scheduled by the segment service provider (e.g., exclusive of amounts received for client-initiated segments).

The interface 600 also presents a client-initiated segment amount 616 that is an amount received for client-initiated segments that operated on the route over the past twelve months. This created segment amount 616 can be based on amounts received from the creators that initiated the segments and amounts received from other clients that provided an amount to claim a spot on the client-initiated segments. The client-initiated segment amount 616 can be determined by identifying the client-initiated segments that operated on the route for the past twelve months, identifying a total amount received for the creation of the segment and for claiming individual spots on each identified segment, and determining a sum of the identified total amounts.

The interface 600 also presents a total amount received for the route 618. This amount can be equal to the sum of the membership amount attributed to the route 612, the paid spots amount 614, and the client-initiated segments amount 616. This total amount represents the total amount (e.g., total amount of revenue) received for the route over the previous twelve months.

The interface 600 also presents a total operator amount for the route 620. The total operator amount for the route 620 can be an estimated or actual amount provided to operators for operating segments (segments scheduled by the segment service provider and/or client-initiated segments) for the route during the previous twelve months. As described above, the estimated operator amount for an individual segment can be determined based on an estimated flight time for the segment and a flight time rate (e.g., hourly rate) for the segment. The total operator amount can be determined by identifying the segments that operated on the route for the past twelve months, determining an estimated operator amount for each identified segment, and determining a sum of the estimated operator amounts for the identified segments.

The interface 600 also presents a total performance for the route 622. The total performance for the route 622 represents the total performance of the route 622 over the previous twelve months. The total performance for the route 622 can be determined by subtracting the total operator amount for the route 620 from the total amount received for the route 618 (e.g., 44,360−43,891=469). If the total operator amount for the route 620 is the total revenue for the route over the previous twelve months, the total performance for the route 622 represents an amount of profit for the route.

The interface 600 also presents a performance margin for the route 624. The performance margin for the route 624 can be determined by dividing the total performance for the route by the total amount received for the route 618 (e.g., 469/44,360*100=1.06%). If the total performance for the route 624 is an amount of profit for the route, the performance margin for the route 624 represents a profit margin for the route.

Figure 7:
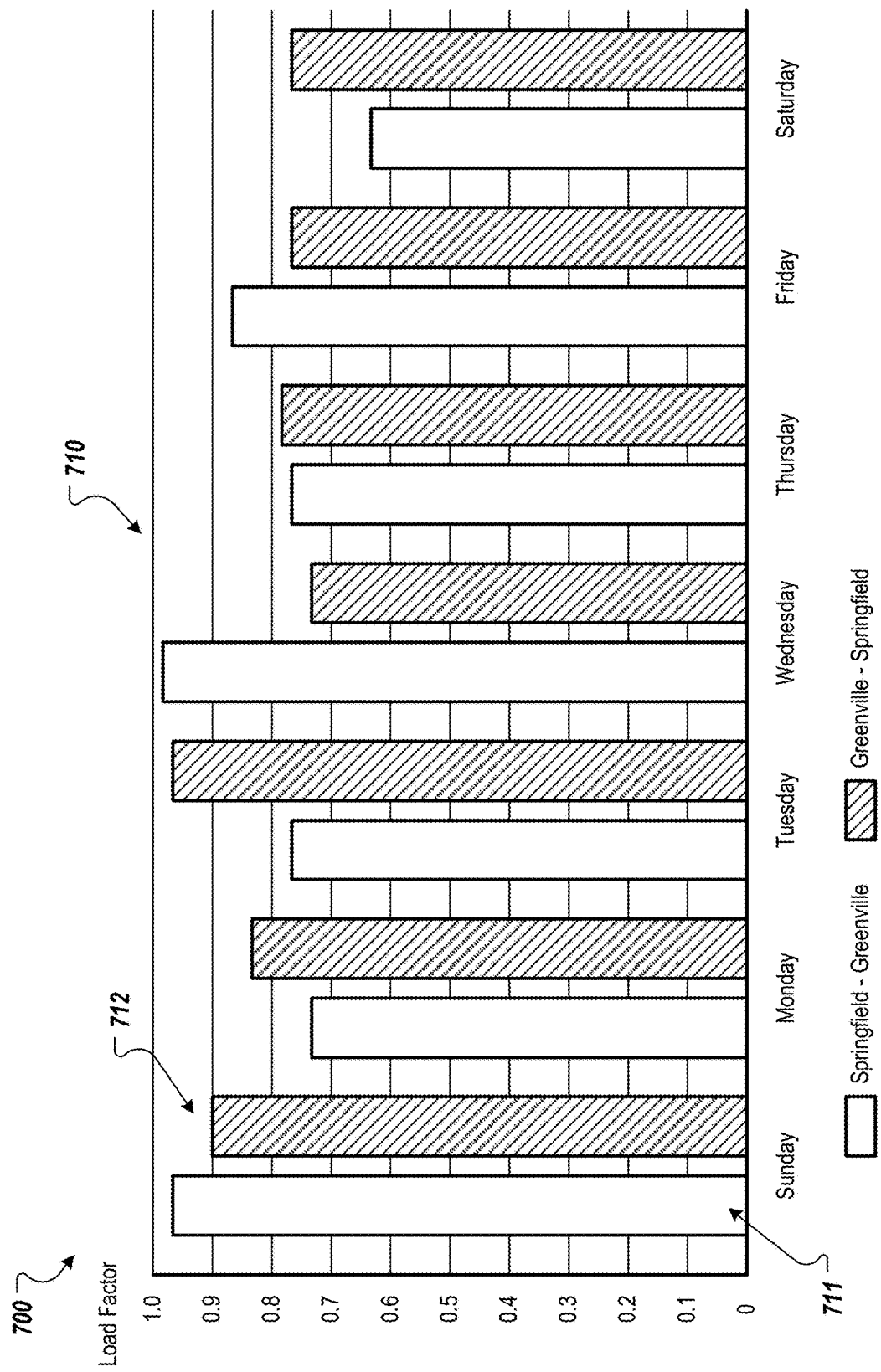
FIG. 7 is a screen shot of an example interface that presents load factor data for a route.

FIG. 7 is a screen shot of an example interface 700 that presents load factor data for a route. The interface 700 includes a bar graph 710 that presents the load factors for a route on a day of the week basis. In particular, the bar graph 710 includes two bars for each day of the week. The two bars for a day of the week includes a bar for each direction. In this example, each day has a first bar with no hatching that represents the load factor for segments that fly from Springfield to Greenville and a second bar with hatching that represents the load factor for segments that fly from Greenville to Springfield. Other visual differences can be used to indicate that the two bars for each day represent different data. For example, the bar for one direction may be a first color and the bar for the opposite direction can be a second color different from the first color.

The load factor for a particular direction and a particular day is based on the occupancy of segments that travels in the particular direction along the route on that day of the week. For example, the load factor represented by the bar 711 for Sunday is based on the occupancy of segments that traveled from Springfield to Greenville on Sundays. In this example, the load factor represented by the bar 711 is about 0.97 or 97%. Similarly, the load factor represented by the bar 712 is based on the occupancy of segments that traveled from Greenville to Springfield on Sundays. In this example, the load factor represented by the bar 712 is about 0.9 or 90%.

The load factor represented by each bar can be based on segments operated during a particular time period. For example, the bar 711 can represent the load factor of segments that were operated on Sundays during a particular month, a particular year, or another appropriate time period. In a particular example, the load factor for a route direction (or route) on a particular day over the course of a particular year can be determined by identifying each segment that traveled on the route direction that was operated on the particular day and during the particular year, determining a total number of spots on the identifies segments, determining a total number of spots claimed on the identified segments, and dividing the total number of spots claimed on the identified segments by the total number of spots on the identified segments. If there was a single segment that was operated from Springfield to Greenville every Sunday during the year 2016, the load factor for this route direction for Sunday would be based on each segment that traveled from Springfield to Greenville on a Sunday during the year 2016.

The bar graph 710 allows a user to quickly compare the load factor for days of the week, which allows the user to identify which days of the week are near capacity and which days of the week are significantly below capacity. This allows the user to optimize the scheduling of segments by make decisions regarding adding scheduled segments (or using larger jets) on days that are near capacity and/or removing segments (or using smaller jets) on days that are significantly below capacity.

Figure 8:
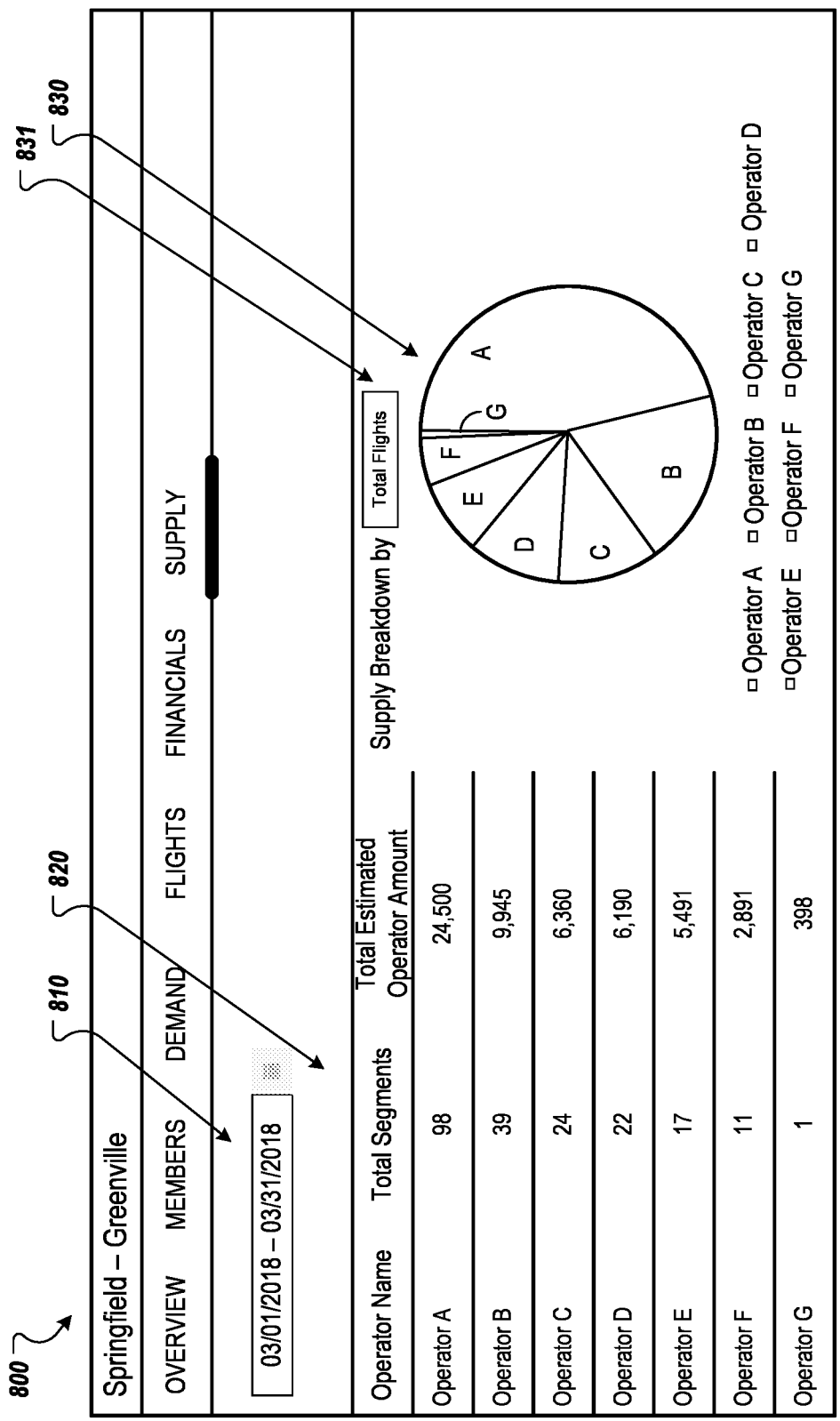
FIG. 8 is a screen shot of an example interface that presents operator data for a route.

FIG. 8 is a screen shot of an example interface 800 that presents operator data for a route. The example interface 800 presents data related to the supply of segments for a route. The interface 800 includes a table 820 of data, a graph 830 of the data, and a date range selector element 810 that enables a user to select a date range for the data. When a user adjusts the date range using the date range selector element 810, the interface 800 can update the data in the table 820 and the graph 830 to present data for the updated date range. For example, the analytics application 142 can send a request for the data to the segment management system 110 and present the data received from the segment management system 110 in the table 820 and the graph 830.

The table 820 includes an operator name column 821 that includes, for a set of operators that have operated at least one segment on the route, a name of the operator. The table 820 also includes a total flights column 822 that includes, for each operator in column 821, data specifying a number segments operated by the operator for the route during the date range specified by the date range selector element 810. In this example, Operator A has operated 98 segments between Springfield and Greenville during the month of March, 2018.

The table 820 also includes a total estimated operator amount column 823 that includes, for each operator in column 821, a total estimated operator amount (e.g., cost) for the segments operated by the operator for the route during the date range specified by the date range selector element 810. In this example, the 98 segments operated by Operator A has a total estimated operator amount of 24,500 (e.g., $24,500).

As described above, the total expected operator amount for a time interval can be determined by identifying the segments for the route that departed during the time interval, determining an estimated operator amount for each identified segment, and determining a sum of the estimated operator amounts for each identified segment. The estimated operator amount for an individual segment can be determined based on an estimated flight time for the segment and a flight time rate (e.g., hourly rate) for the segment. As described above, the flight time rate can be based on the operator, the type of jet selected for the segment, and/or the route.

The graph 830 is a pie chart that illustrates the proportion of segments operated by each of the operators listed in the table 820. In other example, the graph 830 could be a bar graph or other type of appropriate graph. The interface 800 includes a graph selector control 831 that allows a user to switch the graph 830 between presenting the proportion of segments operated by the operators and presenting the proportion of the operator amounts for each operator. The table 820 and graph 830 allow a user to quickly view the breakdown of segments and costs for each route by operator. If some operators use different types (e.g., different size) jets, the table 820 and graph 830 can also allow a user to quickly view the breakdown of the types of jets being used for the route.

The interface 800 requires the creation of new data related to the number of segments operated by each operator and their respective amounts. For example, commercial airlines typically use their own jets for each segment. In a private jet membership environment, multiple different operators may be used for the exact same route. Evaluating the different operators on a per-route basis can allow a segment scheduling manager (or other user) to optimize the sourcing of jets for the route.

Figure 9:
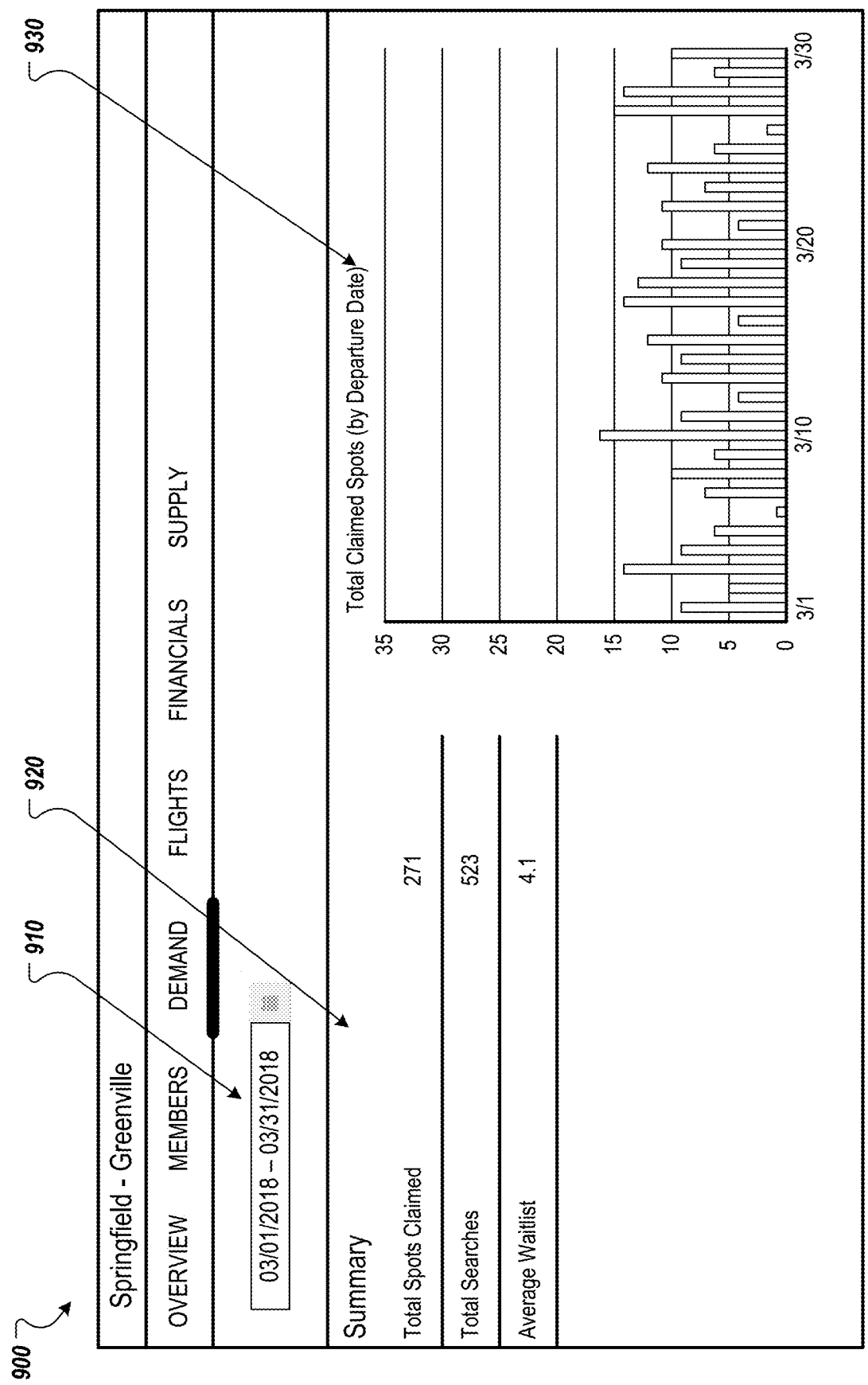
FIG. 9 is a screen shot of an example interface that presents demand data for a route.

FIG. 9 is a screen shot of an example interface 900 that presents demand data for a route. The interface 900 includes a table 920 of data, a graph 930 of the data, and a date range selector element 910 that enables a user to select a date range for the data. When a user adjusts the date range using the date range selector element 910, the interface 900 can update the data in the table 920 and the graph 930 to present data for the updated date range. For example, the analytics application 142 can send a request for the data to the segment management system 110 and present the data received from the segment management system 110 in the table 920 and the graph 930.

The table 920 presents a total number of spots claimed on segments for the route during the date range specified by the date range selector element 910, a total number of searches for segments on the route during the date range, and an average number of waitlist events for segments for the route during the date range. In this example, the table 920 indicates that 271 spots have been claimed on segments for the route between Springfield and Greenville during the month of March, 2018 and clients have initiated 523 searches for segments for the route between Springfield and Greenville that depart during the month of March, 2018. The table 920 also indicates that, on average, there have been 4.1 waitlist events for each segment for the route that departs during the month of March, 2018.

The graph 930 is a bar graph that illustrates the number of claimed spots by departure. For example, each bar may represent a number of spots claimed on the day corresponding to the bar. In particular, the bar for Mar. 1, 2018 indicates that nine spots were claimed on one or more segments that departed on Mar. 1, 2018. This graph 930 allows a user to quickly evaluate the popularity of a route for each day (or part) of the month.

Figure 10:
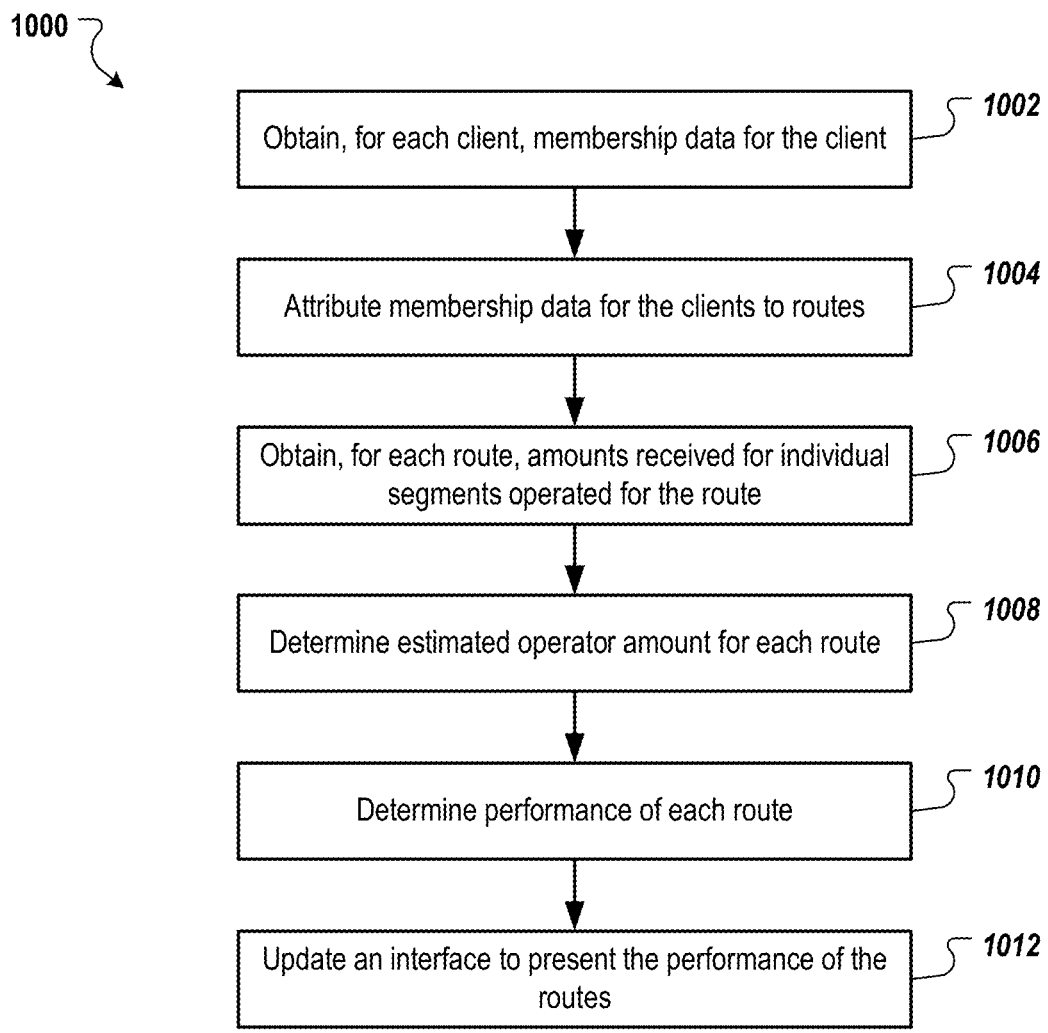
FIG. 10 is a flow chart of an example process for determining the performance of routes and updating an interface to present the performance of the routes.

FIG. 10 is a flow chart of an example process 1000 for determining the performance of routes and updating an interface to present the performance of the routes. Operations of the process 1000 can be performed, for example, by one or more data processing apparatus, such as the segment management system 110. Operations of the process 1000 can also be implemented as instructions stored on a non-transitory computer readable medium. Execution of the instructions cause one or more data processing apparatus to perform operations of the process 1000.

Membership data is obtained for each client (1002). For example, a member profile can be maintained for each client that is a member of a segment service provided by a segment service provided. The member profile for a client can include data for the client, such as name of the client, contact information for the client (e.g., an address and/or phone number), payment information, and/or other appropriate information related to the client. The member profile for a client can also include a geographic identifier (e.g., name of a city, state, region, country, or other geographic identifier) for a primary geographic location for the client. As described above, the primary geographic location for the client can be a location of primary residence.

The membership data for each client can also specify a membership amount (e.g., payment amount) received from the client to become a member. The membership amount can be provided one time (e.g., a single initiation amount) or periodically (e.g., an annual amount). The membership data for a client can also include data identifying segments for which the client claimed a spot, if the client has claimed a spot on at least one segment. The membership data for each client can include, for each route, a number of times the client claimed a spot on a segment on the route.

Membership data for each client can be attributed to routes (1004). In some implementations, the membership amounts included in the membership data for each client is are attributed to routes for which the segment service provider provides segments. The membership amounts can be attributed to the routes using multiple membership data attribution models. An example process for attributing membership amounts to routes is illustrated in FIG. 11 and described below.

Amounts received for individual segments operated for each route are obtained (1006). For example, the amount received for an individual segment can be amount received from clients for individual spots on the segment. The amount received for a route can be determined by identifying the segments for the route (e.g., the segments that traveled between the origin and destination of the route during a time period for which the performance of the route is being determined), identifying, for each identified segment, the total amount received for the identified segment, and determining a sum of the identified total amounts for the identified segments.

An estimated operator amount is determined for each route (1008). As described above, the estimated operator amount for a segment can be determined based on an estimated flight time for the segment and a flight time rate (e.g., hourly rate) for the segment. The estimated operator amount for a route can be determined by identifying the segments for the route (e.g., the segments that traveled between the origin and destination of the route during a time period for which the performance of the route is being determined), determining, for each identified segment, an estimated operator amount for the identified segment, and determining a sum of the determined estimated operator amounts for the identified segments.

A performance of each route is determined (1010). The performance of a route can be determined by subtracting the estimated operator amount for the route from the amount received for the route. A performance margin for a route can also be determined by dividing the performance of the route by the amount received for the route.

An interface is updated to present the performance of the routes (1012). For example, the performance of a route can be presented using the interface 600 of FIG. 6.

FIG. 11 is flow chart of an example process 1100 for attributing membership data to routes and updating an interface to present the attribution. Operations of the process 1100 can be performed, for example, by one or more data processing apparatus, such as the segment management system 110. Operations of the process 1100 can also be implemented as instructions stored on a non-transitory computer readable medium. Execution of the instructions cause one or more data processing apparatus to perform operations of the process 1100.

Membership data for each client is attributed to routes (1102). For example, a respective membership amount received from each client of a segment service provided by a segment service provider can be attributed to routes for which the segment service provider provides routes. The membership amounts received over a time period can be attributed to routes for which segments were provided during the time period. The membership data for a client can be attributed to the routes using constituent operations 1104-1110.

Membership data for the client is obtained (1104). As described above, the membership data for a client can include a member profile (e.g., with a name of the client, contact information for the client payment information, a geographic identifier for a primary geographic location for the client, and/or other appropriate information related to the client), a membership amount (e.g., payment amount) received from the client to become a member, data identifying segments for which the client claimed a spot, if the client has claimed a spot on at least one segment, and/or other appropriate data.

A determination is made whether the membership data for the client includes one or more of (i) data specifying at least one segment on which the client claimed a spot or (ii) a geographic identifier for a primary geographic location for the client (1106). For example, a new client may not have provided data specifying a primary geographic location and/or may not have claimed a spot on a segment.

A given membership data attribution model is selected from multiple membership data attribution models based on the determination of whether the membership data for the client includes one or more of (i) data specifying at least one segment on which the client claimed a spot or (ii) a geographic identifier for a primary geographic location for the client (1108). In some implementations, the multiple membership data attribution models include three different models.

A first membership data attribution model can be used for clients for which the membership data include data specifying at least one segment on which the client claimed a spot, e.g., by initiating a segment or claiming a spot on a segment scheduled by the segment service provider or initiated by another client. The first membership data attribution model can attribute the membership amount for the client to the one or more routes based on a number of spots claimed by the client on segments for each of the one or more routes. For example, the first membership data attribution model can determine, for each route, a ratio between the number of spots claimed by the client on that route and the total number of spots claimed by the client across all of the one or more routes. The first membership data attribution model can then determine the amount to attribute to the route by multiplying the ratio by the membership amount received from the client.

For example, the client may have provided a membership amount of 100 for a membership time period (e.g., one year). If the client has claimed a total of five spots on segments during the membership time period and all five spots are on the same route, the first membership data attribution model can attribute all of the client's membership amount to the one route (i.e., 5/5*100=100). If the client has claimed one spot on a segment for a first route and one spot on a segment for a second route, the client's membership amount can be split evenly between the two routes (i.e., 1/2*100=50 for each route). If the client has claimed two spots on segments for a first route, one spot on a segment for a second route, and one spot on a segment for a third route, the first membership data attribution model can attribute 50 to the first route (i.e., 2/4*100=50), 25 to the second route (i.e., 1/4*100=25) and 25 to the third route (i.e., 2/4*100=25).

A second membership data attribution model can be used for clients for which the membership data includes a geographic identifier for a primary geographic location but does not include data specifying at least one segment on which the client claimed a spot. For example, a client may have completed a profile and provided information specifying a primary residence. However, the client may not yet have traveled on a segment.

The second membership data attribution model can attribute the membership amount for the client based on other clients that have the same primary geographic location (e.g., the same primary residence city) as clients located in the same area are likely to travel on at least some common routes. The second membership data attribution model can attribute the client's membership amount to each of a set of routes based on aggregated ratios for the routes. The aggregated ratios can be based on the number of segments for each route that the other clients that have the same primary geographic location as the client have claimed a spot.

To determine the ratio for a route, a total number of spots claimed by the other clients on segments for the route is determined. A total number of spots claimed by the other clients across all routes is also determined. The ratio for a particular route can be the ratio between the total number of spots claimed by the other clients on segments for the route and the total number of spots claimed by the other clients across all routes. The amount attributed to the particular route can then be determined by multiplying the ratio by the membership amount received from the client. Thus, the average ratio for clients that have the same primary geographic location can be used as a proxy for the ratio used by the first membership data attribution model when data regarding segments for the client is not available.

A third membership data attribution model can be used for clients for which the membership data does not include a geographic identifier for a primary geographic location and does not include data specifying at least one segment on which the client claimed a spot. For example, a new client may not have yet completed a profile and provided information specifying a primary residence or traveled on a segment.

The third membership data attribution model can attribute the client's membership amount across all routes for which the segment service provider provides segments. In some implementations, the third membership data attribution model attributes the client's membership amount across the routes based on a number of segments provided by the segment service provider on each route. For example, the client's membership amount can be attributed to each route based on a ratio between the number of segments provided on the route and the total number of segments provided by the segment service provider across all routes.

For example, assume the segment service provider provides segments on a total of three routes (Springfield-Greenville, Atlanta-New York, and Columbia-Franklin). Also assume that the segment service provider provided 100 segments between Springfield and Greenville, 200 segments between Atlanta and New York, and 700 segments between Columbia and Franklin. In this example, the total number of segments across all routes is 1,000 segments (100+200+700). The ratio for Springfield-Greenville would be 100/1000. To determine the portion of the client's membership amount to attribute to the Springfield-Greenville route, the ratio can be multiplied by the client's membership amount (e.g., 100). In this example, the portion of the client's membership amount attributed to the Springfield-Greenville route would be 10 (i.e., 100/1000*100). Similarly, the portion of the client's membership amount that would be attributed to the Atlanta-New York route would be 20 (i.e., 200/1000*100) and the portion of the client's membership amount that would be attributed to the Columbia-Franklin route would be 70 (i.e., 70/1000*100).

In some implementations, the third membership data attribution model attributes the client's membership amount based on the number of spots claimed on each route during a particular time period, e.g., for the previous twelve months for which the performance of the routes is being determined. In some implementations, the third membership data attribution model attributes the client's membership amount based on the number of spots claimed on each route over a different time period, e.g., for multiple years or for the past month.

After selecting the membership data attribution model, the selected membership data attribution model is used to attribute the membership amount for the client to one or more routes (1110). For example, the selected membership data attribution model is used to determine at least a portion of the membership amount for the client to attribute to each of the one or more routes.

In some implementations, the memberships amounts are attributed periodically based on a specified time period, or in response to a request for membership attribution data or performance data. If a client's membership amount was attributed to routes using the second or third membership data attribution model based on lack of data and that data is later received, the membership amount for the client can be redistributed using a different membership data attribution model. For example, if the second membership data attribution model was used to attribute a client's membership amount prior to the client traveling on a segment, the first membership data attribution model can be used later to redistribute the client's membership amount after the client claims a spot on a segment.

After attributing the membership amount for each member to the routes for which the segment service provider provides segments, the membership amounts for one or more clients attributed to each route are aggregated (1112). For example, a portion of the membership amount of multiple clients may be attributed to a route. In this example, the portion for each of the multiple clients can be aggregated (e.g. added together) to determine a total membership amount attributed to the route.

An interface is updated to present the aggregated membership data for at least one of the routes (1114). For example, an interface such as the interface 600 of FIG. 6 can be updated to present the aggregated membership data for a route. In addition, or in the alternative, an interface can be updated to present a performance measure for the route that is based on the aggregated membership data for the route, as described above with reference to FIG. 10.

Figure 12:
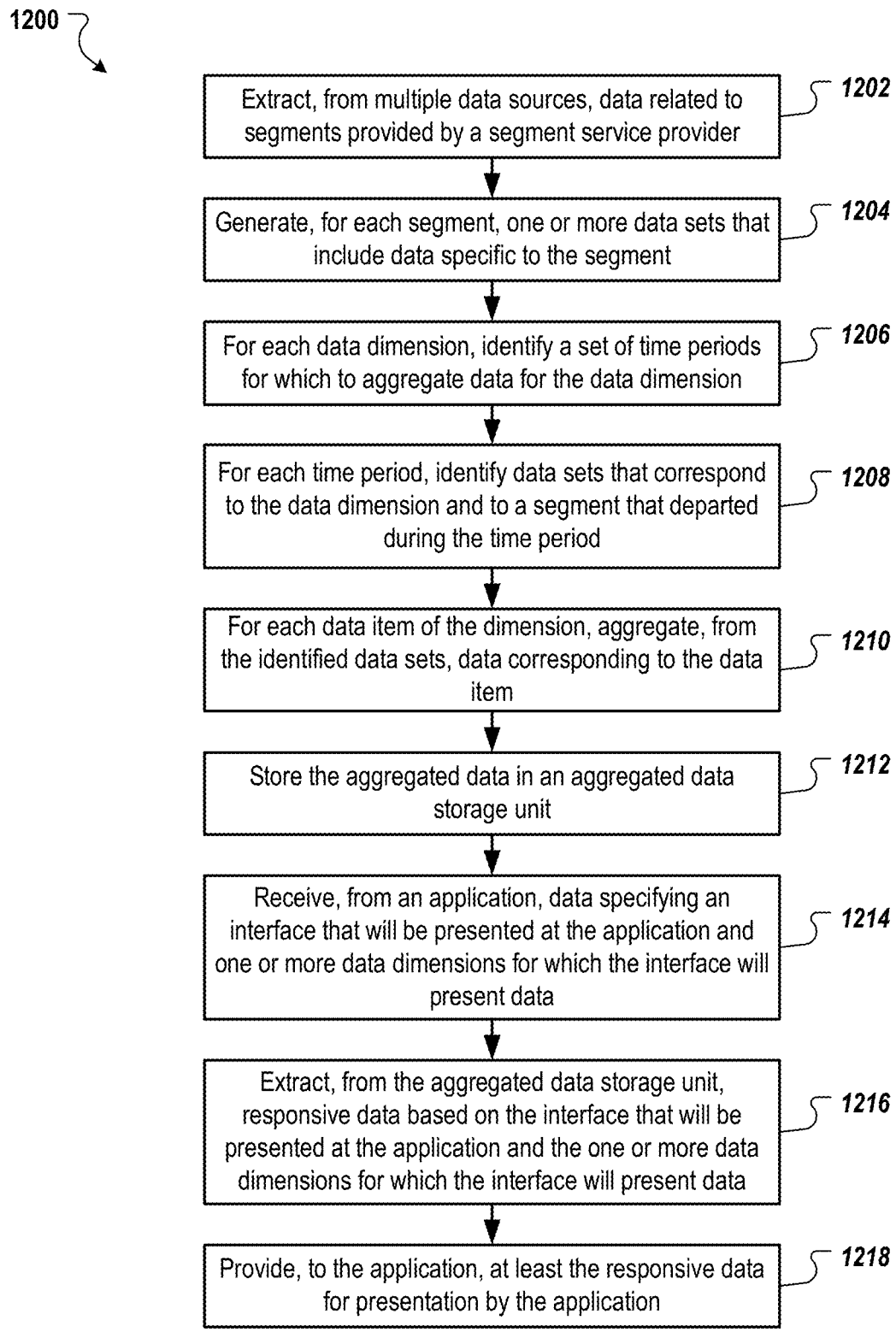
FIG. 12 is a flow chart of an example process for aggregating data and providing the aggregated data for presentation.

FIG. 12 is a flow chart of an example process 1200 for aggregating data and providing the aggregated data for presentation. Operations of the process 1200 can be performed, for example, by one or more data processing apparatus, such as the segment management system 110. Operations of the process 1200 can also be implemented as instructions stored on a non-transitory computer readable medium. Execution of the instructions cause one or more data processing apparatus to perform operations of the process 1200.

Data is extracted from multiple data sources (1202). The data can be data related to segments provided by a segment service provider. For example, the data can include data related to spots on the segments, claimed spots on the segments, amounts required to claim spots on the segments, origin and destinations for the segments, etc. The data can be extracted from various data sources, e.g., databases, applications, networked resources, etc., as described above with respect to FIG. 2. One or more data sets are generated for each segment (1204). Each data set can include data specific to the segment. For example, each data set can include one or more attributes of the segment, e.g., the number of spots on the segment, the number of spots claimed on the segment, the amount per spot on the segment, the origin and destination of the segment, etc.

As described above, each data set for a segment can include data for one or more dimensions. For example, one data set can include data related to spots on the segment and another data set can include data related to costs of the segment (e.g., for use in generating operator or route cost data).

For each data dimension, a set of time periods are identified (1206). For example, some interfaces can present data for particular time periods, e.g., day of the week, weekly, monthly, yearly, etc. If the data dimension will be used to generate an interface, the set of time periods for the data dimension can include time periods based on the time periods for the interface. For example, if the interface presents weekly data, the identified time periods can include one or more weeks.

For each time period and each data dimension, sets of data that correspond to the data dimension and to a segment that departed during the time period are identified (1208). As described above, the staging module can extract data from the data sets and generate tables (or other data structures) that include data for the segments. Each table can include data specifying the origin and destination for the segment and the departure date for the segment. This data can be used to identify tables that include data for segments that departed during the time period. In addition, each table can be for a particular data dimension and include date specifying the data dimension for which the table was generated. This data can be used to identify tables that correspond to the data dimension.

For each data item of the data dimension, data corresponding to the data item is aggregated (1210). For example a data dimension may be for routes and the data items for the routes may be the number of spots on the route, the number of claimed spots on the route, and the number of boarded clients on the route. In this example, the number of spots on a segment, the number of claimed spots on the segment, and the number of boarded clients on the segment can be extracted for each segment for the route that departed during the time period. The number of spots for each segment can be aggregated, e.g., added together, to determine the total number of spots for the route. The number of claimed spots and the number of boarded clients (and other data) can be aggregated in the similar manner.

The aggregated data is stored in an aggregated data storage unit (1212). For example, the aggregated data for each data item can be stored on one or more databases.

Data specifying an interface that will be presented at an application and/or data specifying one or more data dimensions for which the application will present data are received (1214). For example, the data can be received from the application in response to a user navigating to or requesting the interface. The application can send data specifying the interface, the one or more data dimensions, and/or a requested time period for which data should be presented at the interface.

Responsive data is extracted from the aggregated data storage unit (1216). For example, data for the dimension and one or more time periods can be extracted based on the interface that will be presented. In a particular example, the interface may present data related to spots on a route for each month of the year. In this example, the data for the route and for each month, which has already been aggregated for each month, can be extracted from the aggregated data storage unit.

The responsive data is provided to the application (1218). The application can present the data at the interface. As the data was pre-aggregated based on the time periods for which the data would be presented in the interface, the application can present the data with reduced latency as compared to waiting for a system to aggregate the data after receiving a request for the data.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
a first data processing apparatus that:
   extracts, from multiple data sources, data related to segments provided by a segment service provider, the data related to the segments comprising data for a plurality of previously completed segments; and
   generates, for each segment, one or more data sets that include data specific to the segment, each data set for a segment including data for one or more particular data dimensions, wherein each data dimension has a corresponding type of entity for which data is displayed in an interface that displays data for the data dimension;
a second data processing apparatus that accesses the data sets and processes a set of rules to aggregate the data, the aggregating including:
   for each of a plurality of data dimensions that include a set of corresponding data items:
      identifying, based on one or more user interfaces that present data of the data dimension, a set of time periods for which to aggregate data for the data dimension, the set of time periods comprising time periods selectable using one or more user interface controls of the one or more user interfaces;
      for each time period:
         identifying data sets that include (i) data for the corresponding type of entity of the data dimension and (ii) data for one or more segments that departed from an airport during the time period;
         for each data item of the data dimension, generating an aggregate value of the data item for the time period by aggregating, from each of the identified data sets and for multiple segments that departed during the time period, values represented by data corresponding to the data item across multiple previously completed segments that departed during the time period; and
      for each of the one or more user interfaces, storing a portion of the aggregated data that is designated for presentation by the user interface in respective data structure for the user interface in an aggregated data storage unit;
an application programming interface (API) data processing apparatus that:
   receives, from an application executing on a device, data specifying a given interface that will be presented at the application and one or more data dimensions for which the given interface will present data;

extracts, from the respective data structure for the given interface in the aggregated data storage unit, responsive aggregated data based on the given interface that will be presented at the application and the one or more data dimensions for which the given interface will present data; and provides, to the application, at least the responsive data for presentation by the application in the given interface.

2. The system of claim 1, wherein the API data processing apparatus determines one or more performance measures that indicate performance of flights along one or more routes during one or more time periods using the responsive aggregated data and provides, to the application, the determined one or more performance measures for presentation by the application.

3. The system of claim 2, wherein determining the one or more performance measures that indicate the performance of the flights along the one or more routes during the one or more time periods comprises:

generating, for a plurality of routes, an aggregated membership amount based on membership amounts provided by a plurality of clients of the segment service provider, including:

for each client of the plurality of clients of the segment service provider:

selecting, based on a type and/or amount of available data in membership data for the client, a given membership data attribution model from a set of membership data attribution models that are each configured to process data differently based on the type and/or amount of available data to attribute the membership amount provided by the client to a respective different subset of one or more routes in the plurality of routes according to the available data, the selecting comprising:

determining whether the membership data for the client includes one or more of (i) data specifying at least one segment on which the client claimed a spot or (ii) a geographic identifier that identifies a primary geographic location of a primary residence of the client; and based on the determining, selecting, from the set of membership data attribution models, the given membership data attribution model for attributing the membership amount provided by the client to a subset of the plurality of routes; and processing the given membership data attribution model using the membership data for the client, thereby attributing a respective portion of the membership amount provided by the client to each route in the respective subset of routes for the given membership data attribution model; and generating, for each route in the plurality of routes, the aggregated membership amount attributed to the route for a plurality of the clients; and computing, for each route in the plurality of routes and based at least on the aggregated membership amounts, a given performance measure that indicates performance of the route relative to each of one or more other routes.

4. The system of claim 3, wherein the given performance measure for each route is based on a combination of the aggregated membership amounts attributed to the route and an estimated operator amount provided to third party private jet operates that operated private jets to service the route.

5. The system of claim 1, wherein the corresponding data items for each data dimension include data related to the type of entity.

6. The system of claim 5, wherein a particular data dimension is a route between a first geographic location and a second geographic location for which segments are provided by the segment service provider.

7. The system of claim 1, further comprising a staging module that extracts data from the one or more data sets for each particular segment and generates, for each particular segment, a respective table with at least a portion of the data in the data set, wherein each table includes only data for the particular segment corresponding to the table.

8. The system of claim 7, wherein each table includes data specifying a first geographic identifier for an origin, a second geographic identifier for a destination, a departure date for the particular segment corresponding to the one or more data sets for which the table was generated, and the at least a portion of the data in the data set.

9. The system of claim 8, wherein:
a particular data dimension is routed between two geographic locations; and
the second data processing apparatus identifies data for aggregation for a particular route by comparing geographic identifiers for the particular route to the first and second geographic identifiers for each table and comparing a time period for the particular data dimension to departure date for each table.

10. The system of claim 1, wherein:
the data related to the segments provided by the segment service provider, comprises, for each segment, operator data indicating a third party private jet operator data that completed the segment for the segment service provider;
the one or more user interfaces comprises a respective user interface for each route of a set of routes; and
the respective user interface for each route presents, for each third party operator that completed a segment on the route, a number of segments on the route completed by the third party operator during a user-selected time period from among the set of time periods and a total aggregated amount provided to the third party operator for the segments on the route completed by the third party operator during the user-selected time period.

11. A method comprising:
extracting, from multiple data sources, data related to segments provided by a segment service provider, the data related to the segments comprising data for a plurality of previously completed segments;
generating, for each segment, one or more data sets that include data specific to the segment, each data set for a segment including data for one or more particular data dimensions, wherein each data dimension has a corresponding type of entity for which data is displayed in an interface that displays data for the data dimension;
accessing the data sets and processing a set of rules to aggregate the data, the aggregating including:
for each of a plurality of data dimensions that include a set of corresponding data items:
identifying, based on one or more user interfaces that present data of the data dimension, a set of time periods for which to aggregate data for the data dimension, the set of time periods comprising time periods selectable using one or more user interface controls of the one or more user interfaces;
for each time period:

identifying data sets that include (i) data for the corresponding type of entity of the data dimension and (ii) data for one or more segments that departed from an airport during the time period;

for each data item of the data dimension, generating an aggregate value of the data item for the time period by aggregating, from each of the identified data sets and for multiple segments that departed during the time period, values represented by data corresponding to the data item across multiple previously completed segments that departed during the time period; and for each of the one or more user interfaces, storing a portion of the aggregated data that is designated for presentation by the user interface in respective data structure for the user interface in an aggregated data storage unit;

receiving, from an application executing on a device, data specifying a given interface that will be presented at the application and one or more data dimensions for which the given interface will present data;

extracting, from the respective data structure for the given interface in the aggregated data storage unit, responsive aggregated data based on the given interface that will be presented at the application and the one or more data dimensions for which the given interface will present data; and providing, to the application, at least the responsive data for presentation by the application in the given interface.

12. The method of claim 11, further comprising:
determining one or more performance measures that indicate performance of flights along one or more routes during one or more time periods using the responsive aggregated data; and providing, to the application, the determined one or more performance measures for presentation by the application.

13. The method of claim 11, wherein the corresponding data items for each data dimension include data related to the type of entity.

14. The method of claim 13, wherein a particular data dimension is a route between a first geographic location and a second geographic location for which segments are provided by the segment service provider.

15. The method of claim 11, further comprising extracting data from the data sets and generating, for each data set, a table with at least a portion of the data in the data set.

16. The method of claim 15, wherein each table includes data specifying a first geographic identifier for an origin, a second geographic identifier for a destination, a departure date for the segment corresponding to the data set for which the table was generated, and the at least a portion of the data in the data set.

17. The method of claim 16, wherein:
a particular data dimension is routed between two geographic locations; and the method further comprising identifying data for aggregation for a particular route by comparing geographic identifiers for the particular route to the first and second geographic identifiers for each table and comparing a time period for the particular data dimension to departure date for each table.

18. A non-transitory computer storage medium encoded with a computer program, the program comprising instructions that when executed by data processing apparatus cause the data processing apparatus to perform operations comprising:

extracting, from multiple data sources, data related to segments provided by a segment service provider, the data related to the segments comprising data for a plurality of previously completed segments;

generating, for each segment, one or more data sets that include data specific to the segment, each data set for a segment including data for one or more particular data dimensions, wherein each data dimension has a corresponding type of entity for which data is displayed in an interface that displays data for the data dimension;

accessing the data sets and processing a set of rules to aggregate the data, the aggregating including:
for each of a plurality of data dimensions that include a set of corresponding data items:
identifying, based on one or more user interfaces that present data of the data dimension, a set of time periods for which to aggregate data for the data dimension, the set of time periods comprising time periods selectable using one or more user interface controls of the one or more user interfaces;

for each time period:
identifying data sets that include (i) data for the corresponding type of entity of the data dimension and (ii) data for one or more segments that departed from an airport during the time period;

for each data item of the data dimension, generating an aggregate value of the data item for the time period by aggregating, from each of the identified data sets and for multiple segments that departed during the time period, values represented by data corresponding to the data item across multiple previously completed segments that departed during the time period; and for each of the one or more user interfaces, storing a portion of the aggregated data that is designated for presentation by the user interface in respective data structure for the user interface in an aggregated data storage unit;

receiving, from an application executing on a device, data specifying a given interface that will be presented at the application and one or more data dimensions for which the given interface will present data;

extracting, from the respective data structure for the given interface in the aggregated data storage unit, responsive aggregated data based on the given interface that will be presented at the application and the one or more data dimensions for which the given interface will present data; and providing, to the application, at least the responsive data for presentation by the application in the given interface.

19. The non-transitory computer storage medium of claim 18, wherein the operations comprise:
determining one or more performance measures that indicate performance of flights along one or more routes during one or more time periods using the responsive aggregated data; and providing, to the application, the determined one or more performance measures for presentation by the application.

20. The non-transitory computer storage medium of claim 18, wherein the corresponding data items for each data dimension include data related to the type of entity.

* * * * *